US011299146B2

(12) United States Patent
Sadamoto et al.

(10) Patent No.: US 11,299,146 B2
(45) Date of Patent: Apr. 12, 2022

(54) MOBILE BODY, CONTROL DEVICE, SURROUNDING OBJECT DETECTOR, AND MONITORING DEVICE

(71) Applicant: Kabushiki Kaisha Toshiba, Minato-ku (JP)

(72) Inventors: Atsushi Sadamoto, Yokohama (JP); Takafumi Sonoura, Yokohama (JP); Daisuke Yamamoto, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 224 days.

(21) Appl. No.: 16/551,017

(22) Filed: Aug. 26, 2019

(65) Prior Publication Data

US 2020/0290603 A1 Sep. 17, 2020

(51) Int. Cl.
*B60W 30/09* (2012.01)
*B60B 19/00* (2006.01)

(52) U.S. Cl.
CPC ........... *B60W 30/09* (2013.01); *B60B 19/003* (2013.01); *B60W 2520/28* (2013.01); *B60W 2554/00* (2020.02)

(58) Field of Classification Search
CPC ............. B60W 30/09; B60W 2554/00; B60W 2520/28; B60B 19/003
See application file for complete search history.

(56) References Cited

U.S. PATENT DOCUMENTS 6,127,964 A * 10/2000 Kageyama ............ G01S 7/4004 342/70
2011/0077814 A1 3/2011 Haberer et al.
2011/0153139 A1 6/2011 Erb et al.
2013/0253769 A1 9/2013 Kamo et al.
2016/0236347 A1 8/2016 Shikina et al.
2019/0284033 A1 9/2019 Yamamoto et al.
(Continued)

FOREIGN PATENT DOCUMENTS

JP 8-517 A 1/1996
JP 2013-226387 A 11/2013
JP 2015-230527 A 12/2015
(Continued)

*Primary Examiner* — Peter D Nolan
*Assistant Examiner* — Mikko Okechukwu Obioha
(74) *Attorney, Agent, or Firm* — Oblon, McClelland, Maier & Neustadt, L.L.P.

(57) ABSTRACT

A mobile body, a control device, a surrounding object detector, and a monitoring device capable of controlling a safety system of a mobile body having an omnidirectional movement mechanism with a simple configuration are provided. A mobile body according to an embodiment includes drive wheels, a rotational velocity detector, an object detector, a controller, and a changer. The drive wheels are three or more drive wheels that allows the mobile body to move in all directions, and the respective drive wheels are driven independently. The rotational velocity detector detects respective rotational velocities of the drive wheels. The object detector detects an object around the mobile body. The controller decelerates or stops the mobile body when an object is detected in a monitoring area by the object detector. The changer changes a range of the monitoring area on the basis of the respective rotational velocities of the drive wheels detected by the rotational velocity detector.

14 Claims, 10 Drawing Sheets

(56) References Cited

U.S. PATENT DOCUMENTS

| | | | | |
|---|---|---|---|---|
| 2020/0172096 | A1* | 6/2020 | Lord | G06K 9/00791 |
| 2020/0398850 | A1* | 12/2020 | Gariepy | B60W 30/18172 |

FOREIGN PATENT DOCUMENTS

| | | | |
|---|---|---|---|
| JP | 2016-62441 | A | 4/2016 |
| JP | 2016-151897 | A | 8/2016 |
| JP | 2018-148728 | A | 9/2018 |
| JP | 2019-156289 | A | 9/2019 |

* cited by examiner

MOBILE BODY, CONTROL DEVICE, SURROUNDING OBJECT DETECTOR, AND MONITORING DEVICE

CROSS-REFERENCE TO RELATED APPLICATIONS

This application is based upon and claims the benefit of priority from Japanese Patent Application No. 2019-047759, filed Mar. 14, 2019, the entire contents of which are incorporated herein by reference.

BACKGROUND

Field of the Invention

Embodiments of the present invention relate to a mobile body, a controller, a surrounding object detector, and a monitoring device.

Description of Related Art

In the related art, mobile bodies such as robots or carriers that move (travel) autonomously have been put into practical use in order to save labor of transporting cargo in a distribution warehouse. An example of a scheme of controlling traveling of a mobile body has a guide scheme in which the mobile body travels along a guiding line of a floor surface, and a guideless scheme for detecting an environment around the mobile body to perform autonomous control. Further, the mobile body includes a noncontact obstacle detector that detects an obstacle in a monitoring area, or a controller that stops the mobile body using a detection result of an obstacle detector. Accordingly, even when there is an obstacle in a traveling direction, the mobile body can be stopped without colliding with the obstacle.

Further, in recent years, a mobile body having three or more drive wheels and including an omnidirectional movement mechanism movable in all directions has been known. For example, a mecanum wheel may be used for the drive wheel to be used for the omnidirectional movement mechanism. The mobile body movable in all directions can instantly perform complex operations, such as forward movement, change of direction, movement to a sideway, and turning on the spot. Here, there is a mobile body that includes a safety control system for the purpose of protecting people. The safety control system reduces a velocity of the mobile body or stops the mobile body, for example, when an obstacle or the like in a monitoring area is detected by a sensor or the like.

Further, when the mobile body always detects an object in the monitoring area as an obstacle in any case, for example, the mobile body stops when approaching a transport target, and cannot achieve an original purpose of transporting the transport target. Therefore, it is possible to regard the mobile body as having moved near the transport target when the mobile body travels at a predetermined velocity or less, and prevent the transport target from being detected as an obstacle by reducing the monitoring area.

Here, it is assumed that a velocity command value to be used for velocity control of the mobile body is used to a determination as to whether the mobile body movable in all directions is at a predetermined velocity or less. In this case, a velocity indicated by the velocity command value may differ from an actual velocity of the mobile body, for example, due to a time delay due to inertia of a motor control system or the mobile body, a delay in signal processing, or an error. Therefore, the mobile body may determine to be at the predetermined velocity or less even when an actual velocity of the mobile body is not the predetermined velocity or less. Accordingly, the mobile body may reduce the monitoring area and be unable to appropriately detect an obstacle. Therefore, in the related art, there is concern that the safety of the mobile body movable in all directions cannot be ensured.

DETAILED DESCRIPTION

A mobile body according to an aspect includes drive wheels, a rotational velocity detector, an object detector, a controller, and a changer. The drive wheels are three or more drive wheels that allows the mobile body to move in all directions, and the respective drive wheels arc driven independently. The rotational velocity detector detects respective rotational velocities of the drive wheels. The object detector detects an object around the mobile body. The controller decelerates or stops the mobile body when an object is detected in a monitoring area by the object detector. The changer changes a range of the monitoring area on the basis of the respective rotational velocities of the drive wheels detected by the rotational velocity detector.

Hereinafter, a mobile body, a control device, a surrounding object detector, and a monitoring device according to an embodiment will be described with reference to the drawings.

First Embodiment

Figure 1A:
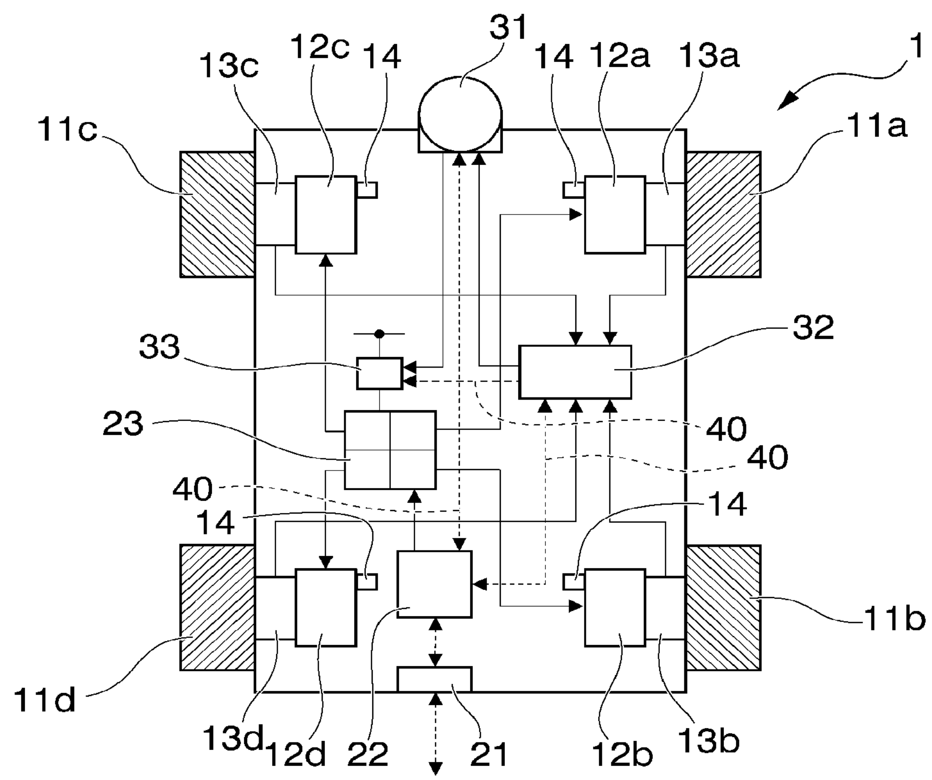
FIG. 1A is a diagram showing an example of an entire configuration of an omnidirectional mobile body according to a first embodiment.

FIG. 1A is a diagram showing an example of an entire configuration of an omnidirectional mobile body 1 according to a first embodiment. The omnidirectional mobile body 1 is, for example, a transport robot that are configured to moves (travels) autonomously. Specifically, the omnidirectional mobile body 1 transports a basket cart for distribution in a distribution warehouse. The omnidirectional mobile body 1 includes a drive system and a control system.

First, the drive system will be described. The drive system includes four mecanum wheels 11*a* to 11*d*, four drive motors 12*a* to 12*d*, and four rotational velocity detectors 13*a* to 13*d*. It should be noted that the mecanum wheels 11*a* to 11*d* are simply referred to as a "mecanum wheel 11" when it is not necessary to distinguish the mecanum wheels 11*a* to 11*d*. Similarly, the drive motors 12*a* to 12*d* and the rotational velocity detectors 13*a* to 13*d* may also be described as a "drive motor 12" and a "rotational velocity detector 13".

The mecanum wheel 11 includes a plurality of barrels on a wheel circumference. The respective barrels rotate. Accordingly, the mecanum wheel 11 enables the omnidirectional mobile body 1, for example, to instantly move forward, turn around, move sideways, turn on the spot, without a preparation operation. It should be noted that details of the mecanum wheel 11 will be described below with reference to FIG. 2.

The drive motor 12 generates a torque to drive the mecanum wheel 11. The drive motor 12 includes a function of a decelerator. The decelerator decelerates the rotation of the drive motor 12 (increases the torque), and transmits a rotational force to the mecanum wheel 11.

The rotational velocity detector 13 is a velocity sensor. The rotational velocity detector 13 detects a rotational velocity of the mecanum wheel 11 and converts the amount of rotation into an electrical signal. For example, a rotary encoder is used for the rotational velocity detector 13. Further, a brake 14 that stops rotation of each wheel may be provided. The brake 14 preferably applies a braking force by shutting off energization of the drive motor 12. It should be noted that an arrow line connecting the motor control circuit 23 and the drive motor 12 in FIG. 1A indicates a wire for motor driving and a wire for energization of the brake 14 in a case in which the brake 14 is used.

Next, the control system will be described. The control system includes an external communication device 21, a main controller 22, a motor control circuit 23, a safety laser scanner 31, a protection area controller 32, and a circuit breaker 33. The external communication device 21 performs wireless communication with an external communication device via a network. The external communication device 21 receives a movement plan at a predetermined timing from an external computer device that manages all the omnidirectional mobile bodies 1 in the distribution warehouse.

The movement plan includes various pieces of information on the transport of the omnidirectional mobile body 1. This information is, for example, information on a movement path of the omnidirectional mobile body 1 in the distribution warehouse, information on an area in which the omnidirectional mobile body 1 travels at a low velocity, information indicating a basket cart that is a transport target, and information indicating a transport destination of the transport target. The external communication device 21 outputs the received information to the main controller 22. The external communication device 21 is a communication interface. It should he noted that the network includes, for example, the Internet, a wide area network (WAN), a local area network (LAN), a cellular network, Wi-Fi (registered trademark), Bluetooth (registered trademark), near field communication (NFC), and infrared communication.

The safety laser scanner 31 is a sensor that detects the presence of an object around the omnidirectional mobile body 1. Specifically, the safety laser scanner performs scanning with an infrared laser and measures a time delay of reflected light. Accordingly, the safety laser scanner 31 measures a distance to the surrounding object or a shape of the object. The safety laser scanner 31 is attached to the front of the omnidirectional mobile body 1, for example.

The safety laser scanner 31 determines whether an object is present in a preset area (monitoring area). The safety laser scanner 31 outputs a stop signal to the main controller 22 when a determination is made that the object has been present in the preset area. The stop signal is a signal for stopping a device such as the drive motor 12.

Here, examples of the output signal of the safety laser scanner include a non-safety signal and a safety signal. The non-safety signal is used for the purpose of protecting the omnidirectional mobile body 1, such as deceleration of the omnidirectional mobile body 1. On the other hand, the safety signal is a signal for reliably stopping the omnidirectional mobile body 1 when a dangerous event occurs, for example, a relay for shutting off power. The non-safety signal is output to, for example, the main controller 22. The safety signal is output to, for example, the circuit breaker 33 or the main controller 22.

The main controller 22 outputs an operation signal for switching the operation of the omnidirectional mobile body 1 to the motor control circuit 23 using the movement plan of the omnidirectional mobile body 1. It should be noted that the main controller 22 is not limited to wirelessly acquiring the movement plan from the external communication device 21. The main controller 22 may acquire the movement plan through an input operation of an operator or may acquire the movement plan through wired connection with an external device.

Further, when the safety laser scanner 31 detects an object in the monitoring area, the main controller 22 outputs an operation signal for decelerating the omnidirectional mobile body 1 to the motor control circuit 23.

The motor control circuit 23 controls the rotation of the drive motor using the operation signal output from the main controller 22, thereby moving or decelerating the omnidirectional mobile body 1 at a predetermined velocity in a predetermined direction. A means for stopping the omnidirectional mobile body 1 is a means for stopping rotation through inertia due to loss of a driving force to each drive motor 12 when power to the motor control circuit 23 is shut off, or a means for stopping rotation using a braking torque due to electric resistance (dissipation of regenerative power) in the motor control circuit 23 or a drive motor system, in addition to a means for stopping control according to the rotational velocity command value from the main controller 22. Further, when the omnidirectional mobile body 1 includes the brake 14, the braking force is generated by shutting off the energization of the brake 14 from the motor control circuit 23. Accordingly, the motor control circuit 23 can also stop the omnidirectional mobile body 1.

Here, a control system of the autonomous mobile robot including the omnidirectional mobile body 1 includes two control systems including a normal control system and a safety control system. The normal control system is a control system that detects a situation of a surrounding obstacle and moves the omnidirectional mobile body 1 efficiently. For example, the normal control system controls an operation of the omnidirectional mobile body 1 using a value obtained by the safety laser scanner 31, map information, and the movement plan. For example, the normal control system also performs creation of the map information using data of distance to surrounding objects. The distance data is included in the non-safety signal output from the safety laser scanner 31. Further, the normal control system also has a function as the movement plan and an interface that is operated by an operator.

In the control system of the autonomous mobile robot, it is necessary to ensure sufficient reliability for the purpose of protecting a person, such as avoiding an accident due to a malfunction of an operation or avoiding a collision with a person in preference to other operations. It is not sufficient to ensure such reliability only with a function of the normal control system, and it may be difficult to achieve both the efficiency of transport and the safety of transport.

Therefore, the control system of the omnidirectional mobile body 1 includes a safety control system separately from the normal control system. The safety control system is a control system for mainly securing safety. Specifically, the safety control system monitors a surrounding situation using the safety laser scanner 31 and reliably stops the omnidirectional mobile body 1 when approach of an object such as an obstacle has been detected. It should be noted that, in FIG. 1A, reference sign 40 indicates a control signal including a safety related signal.

For example, the safety laser scanner 31 outputs a safety signal to the circuit breaker 33 when an object is detected in the protection area. When the safety signal is input, the circuit breaker 33 shuts off power to be supplied to the motor control circuit 23 to stop driving of each mecanum wheel 11. Further, the omnidirectional mobile body 1 stops rotation using inertia due to loss of a driving force, stops the rotation through generation of a braking torque due to electric resistance (consumption of regenerative power) in the motor control circuit 23 and the drive motor system, or stops the rotation using a braking force of the brake 14 when the brake 14 is further included. The circuit breaker 33 is realized by, for example, a safety relay.

Further, the safety control system is required to have a function having such a robustness that does not fail for a long period of time in order to reliably stop the omnidirectional mobile body 1 even when an abnormality has occurred in the normal control system, a function of detecting a failure, or a function of safely stopping the omnidirectional mobile body 1 when failure has been detected.

Here, for the monitoring area, for example, a protection area and a warning area are set toward a side far from a center of the safety laser scanner 31. The safety laser scanner 31 can store a plurality of patterns indicating the range of the monitoring area.

The protection area controller 32 switches the pattern set in the safety laser scanner 31. Specifically, the protection area controller 32 switches the pattern (the range of the warning area or the protection area) according to respective operations of the omnidirectional mobile body 1. Examples of the respective operations of the omnidirectional mobile body 1 include an operation in which the omnidirectional mobile body 1 travels alone, an operation of transporting a transport target, and an operation of picking up a transport target.

Here, when the safety control system always functions, the convenience of the omnidirectional mobile body 1 may be impaired, and an original use purpose may not be achieved. For example, when the safety control system is functioning in a case in which the omnidirectional mobile body 1 picks up (docks) a transport target, the transport target may be detected as an obstacle, and the omnidirectional mobile body 1 may stop. That is, in some cases, it is not possible to pick up the transport target (crawling under the transport target) and to achieve an original purpose of transporting the transport target.

Therefore, when the omnidirectional mobile body 1 approaches the transport target, the safety control system temporarily reduces a range of the protection area set in the safety laser scanner 31 or disables (mutes) the range of the protection area. Specifically, when the omnidirectional mobile body 1 becomes at a predetermined velocity or less, the protection area control circuit 302 temporarily reduces or disables the protection area. Accordingly, the omnidirectional mobile body 1 can pick up the transport target.

It should be noted that a signal transferred between respective devices may include a signal for periodically detecting a failure. Further, an example of a device that receives the signal may include a temporal filter that does not respond to the signal for detecting a failure. Further, in FIG. 1A, a signal line transferred between the respective devices indicates one line, but may be duplexed, like a signal wiring used in a general safety control system. Further, for transfer of information between respective devices, an industrial communication protocol (for example, Ethernet/IP, PROFINET, EtherCAT, Profibus, Modbus, CC-Link, or CANopen) and a communication protocol for safety thereof may be used.

It should be noted that the main controller 22 is realized by a hardware processor such as a central processing unit (CPU) executing a program (software). Further, the motor control circuit 23 and the protection area control circuit 302 are each realized by hardware (including circuitry).

However, each of the motor control circuit 23 and the protection area control circuit 302 may be realized, for example, by a hardware processor such as a CPU executing a program. In the main controller 22, the motor control circuit 23, and the protection area control circuit 302, some or all of components thereof may be realized by hardware (including circuitry) such as a large scale integration (LSI), an application specific integrated circuit (ASIC), a field-programmable gate array (FPGA), or a graphics processing unit (GPU) or may be realized by software and hardware in cooperation. The program may be stored in a storage device (a storage device including a non-transitory storage medium) such as a hard disk drive (HDD) or a flash memory in advance or may be stored in a removable storage medium (a non-transitory storage medium) such as a DVD or a CD-ROM and the storage medium may be mounted in a drive device so that the program may be installed. Each functional unit is realized by the processor executing a program stored in the storage unit.

(Specific Example of Control Signal 40)

Figure 1B:
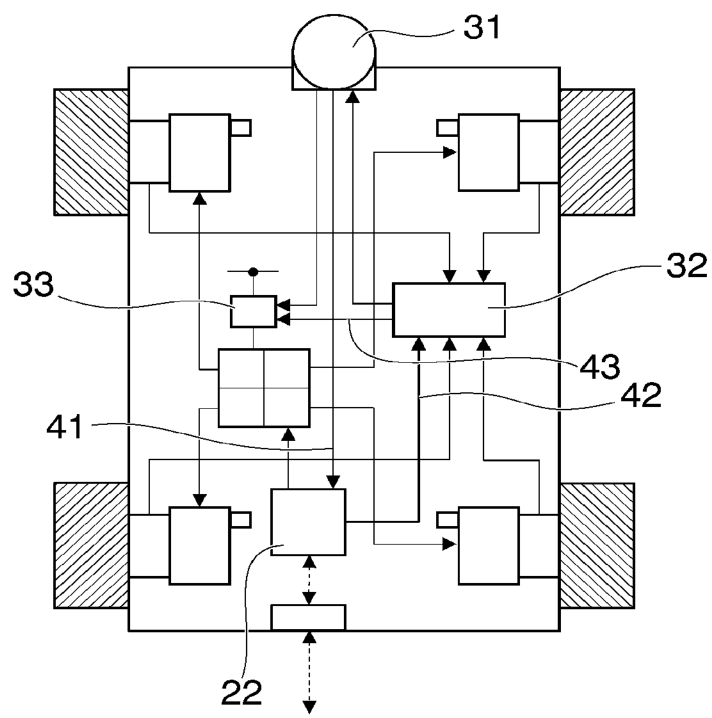
FIG. 1B shows a specific example of a control signal.

FIG. 1B is a diagram showing a specific example of the control signal 40. In FIG. 1B, the control signal 40 shown in FIG 1A includes a deceleration (alarm) signal 41, an operation mode signal 42, and an emergency stop signal 43. The deceleration signal 41 is a signal that is output from the safety laser scanner 31 to the main controller 22 when an object in the warning area is detected by the safety laser scanner 31. When the deceleration signal 41 is input, the main controller 22 controls the motor control circuit 23 to reduce the velocity of the omnidirectional mobile body 1.

The operation mode signal 42 is a signal that is output from the main controller 22 to the protection area controller 32, for example, when transition to the docking mode is performed. When the operation mode signal 42 is input, the protection area controller 32 temporarily reduces the range of the protection area set in the safety laser scanner 31 or disables (mutes) the range of the protection area.

The emergency stop signal 43 is a signal that is output from the protection area controller 32 to the circuit breaker 33 when the protection area controller 32 determines that there is an abnormality in a velocity value, such as the velocity of the omnidirectional mobile body 1 having reached an upper limit on a design. The circuit breaker 33 shuts off the power to be supplied to the motor control circuit 23 when the emergency stop signal 43 is input. Accordingly, the velocity of the omnidirectional mobile body 1 is decelerated (stopped).

(Configuration of Mecanum Wheels 11*a* to 11*d*)

Figure 2:
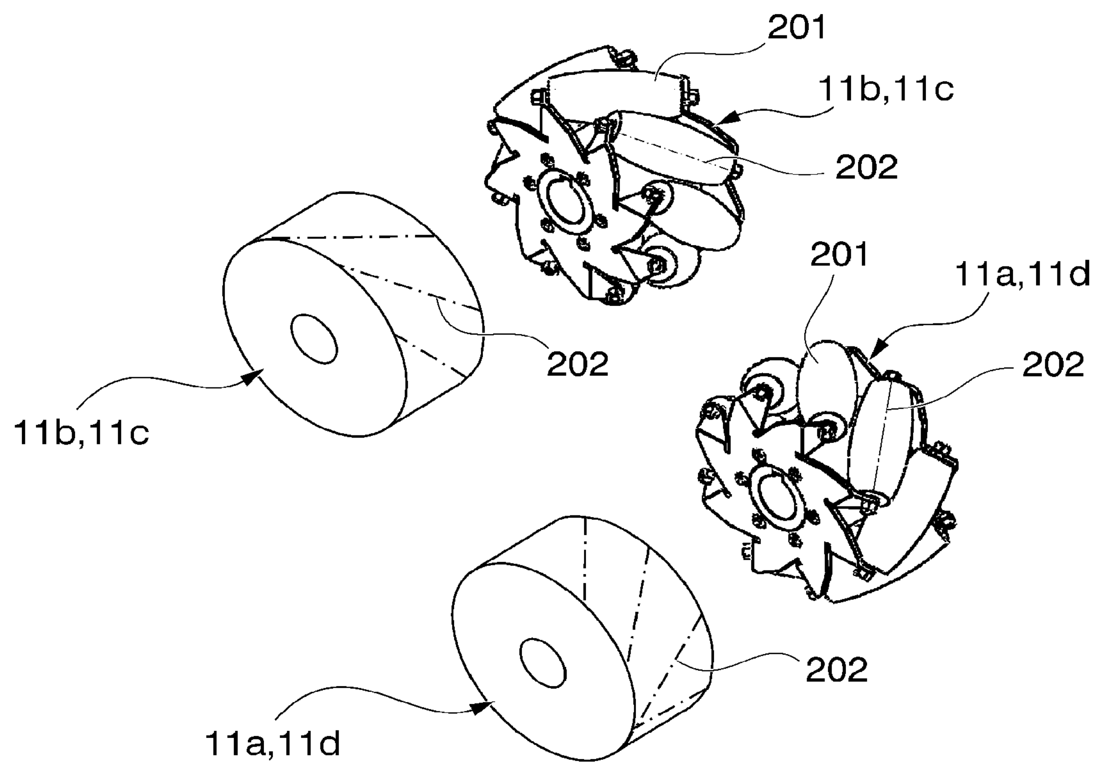
FIG. 2 is a diagram showing an example of a configuration of mecanum wheels.

FIG. 2 is a diagram showing an example of a configuration of the mecanum wheels 11*a* to 11*d*. In FIG. 2, the mecanum wheels 11*a* to 11*d* each include a plurality of barrel-shaped rollers 201. The plurality of barrel-shaped rollers 201 are attached to an outer circumference of the wheel to be inclined with respect to a wheel shaft. Wheel diameters of the mecanum wheels 11*a* to 11*d* are the same. However, the wheel diameters may be different wheel diameters.

In FIG. 2, a center line 202 indicates an inclination of the barrel-shaped roller 201. In each of the mecanum wheels 11*a* to 11*d*, the plurality of barrel-shaped rollers 201 rotate at the same rotational velocity in the same direction. The mecanum wheels 11*a* to 11*d* includes two types: a mecanum wheel for right hand to which the barrel-shaped roller 201 is attached to be inclined upward to the right, and a mecanum wheel for left hand to which the barrel-shaped roller 201 is attached to be inclined upward to the left. The respective mecanum wheels 11*a* to 11*d* are disposed at four places in front, rear, left, and right of a casing 300 (see FIG. 3) of the omnidirectional mobile body 1, as in a four-wheeled automobile.

Further, different types (right hand and left hand) of mecanum wheels 11*a* and 11*b* (11*c* and 11*d*) are disposed at front and rear disposed on the right side (or left side). Further, for the mecanum wheels 11*a* and 11*d* (11*b* and 11*c*) disposed on a diagonal line of the omnidirectional mobile body 1, the same type of mecanum wheels for right hand (left hand) are disposed. It should be noted that both of the mecanum wheels 11*a* and 11*d* and the mecanum wheels 11*b* and 11*c* may be for right hand or left hand. The right hand or left hand is a design matter and can be arbitrary.

By disposing the mecanum wheels 11*a* to 11*d* in this manner, a traveling direction and a posture of the omnidirectional mobile body 1 are stabilized due to a balance of thrusts generated by the respective wheels. For example, it is possible to move the omnidirectional mobile body 1 in one direction by each wheel rotating at a predetermined velocity. For example, it is possible to move the omnidirectional mobile body 1 through forward movement, backward movement, movement to a sideway, turning, diagonal movement, or the like.

(Coordinate System of Omnidirectional Mobile Body 1 and Mecanum Wheels 11*a* to 11*d*)

Figure 3:
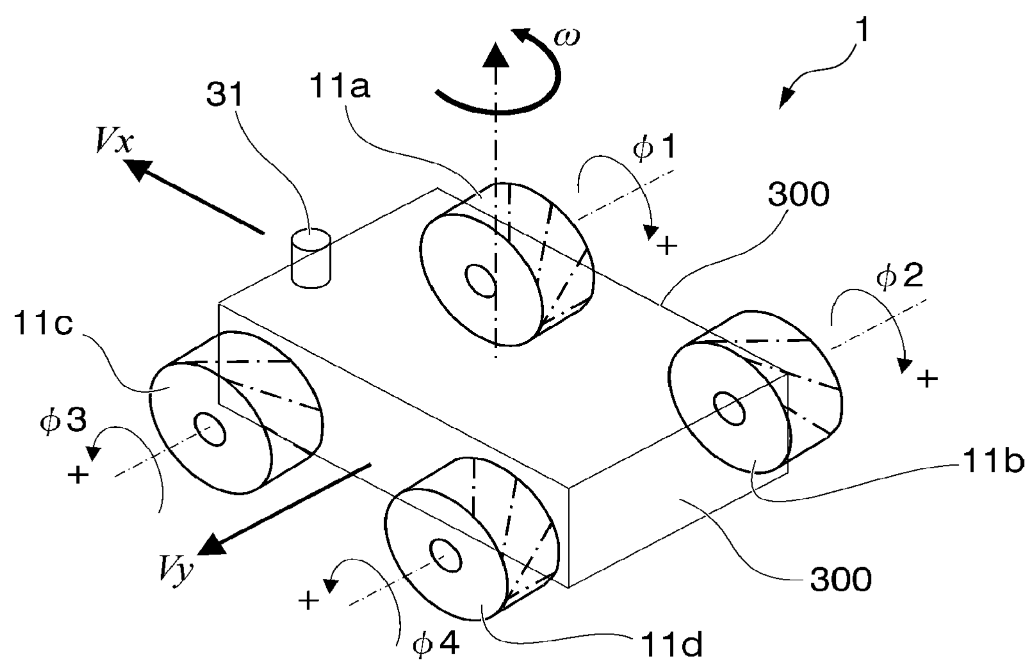
FIG. 3 is a diagram showing an example of a coordinate system of the omnidirectional mobile body and the mecanum wheels.

FIG. 3 is a diagram showing an example of a coordinate system of the omnidirectional mobile body 1 and the mecanum wheels 11*a* to 11*d*. As shown in FIG. 3, an x-axis, a y-axis, and a z-axis are defined by a right-handed coordinate system. The x-axis indicates a front-rear direction. The y-axis indicates a lateral direction. The z-axis indicates a height direction. The velocity in the forward movement direction of the omnidirectional mobile body 1 is a main movement velocity Vx. The velocity in the lateral direction of the omnidirectional mobile body 1 is Vy. The turning velocity of the omnidirectional mobile body 1 is ω.

For the rotational direction of each mecanum wheel 11, a counterclockwise direction toward a direction of attachment to the omnidirectional mobile body 1 is positive. Further, a rotational velocity of the mecanum wheel 11*a* is ϕ1, a rotational velocity of the mecanum wheel 11*b* is ϕ2, a rotational velocity of the mecanum wheel 11*c* is ϕ3, and a rotational velocity of the mecanum wheel 11*d* is ϕ4.

Hereinafter, a case in which the omnidirectional mobile body 1 moves forward, a case in which the omnidirectional mobile body 1 moves sideways, and a case in which the omnidirectional mobile body 1 moves turns on the spot will be described.

(Moving Forward)

When ϕ1=−1 rad/s, ϕ2=−1 rad/s, ϕ3=1 rad/s, and ϕ4=1 rad/s, the omnidirectional mobile body 1 moves forward at a main movement velocity Vx of 1 m/s in an x-axis direction.

(Moving Sideways)

When ϕ1=−1 rad/s, ϕ2=1 rad/s, ϕ3=−1 rad/s, and ϕ4=1 rad/s, the omnidirectional mobile body 1 moves in a lateral direction at a velocity Vy of 1 m/s in a y-axis direction.

(Turning on Spot)

When ϕ1=−0.5 rad/s, ϕ2=−0.5 rad/s, ϕ3=−0.5 rad/s, and ϕ4=−0.5 rad/s, the omnidirectional mobile body 1 turns at an angular velocity of ω=1 rad/s on the spot.

It should be noted that a sign of rotation and translation directions is determined according to a defined coordinate system or direction, and disposition of right and left types of the mecanum wheels 11. For example, when the defined coordinate system or direction and the right and left types of the mecanum wheels 11 are different from those shown in the drawings, the sign of the movement direction is different from the above illustration.

A relationship between the rotational velocity of each mecanum wheel 11 and a movement velocity of the omnidirectional mobile body 1 with respect to the omnidirectional mobile body 1 including four mecanum wheels 11 will be described herein. The rotational velocity of each mecanum wheel 11 and the movement velocity of the omnidirectional mobile body 1 can be expressed by Equation (1).

$$\begin{pmatrix} V_x \\ V_y \\ \omega \end{pmatrix} = A \begin{pmatrix} \Phi_1 \\ \Phi_2 \\ \Phi_3 \\ \Phi_4 \end{pmatrix} \quad \text{[Math. 1]}$$

A is a 3×4 matrix. Matrix components include a wheel diameter of the mecanum wheel 11 and a coefficient related to the wheel disposition. Equation (1) is an equation called forward kinematics.

On the other hand, Equation (2) is an equation called inverse kinematics. Equation (2) is a calculation equation for calculating a necessary wheel rotational velocity from a target velocity of the omnidirectional mobile body 1.

$$\begin{pmatrix} \Phi_1 \\ \Phi_2 \\ \Phi_3 \\ \Phi_4 \end{pmatrix} = B \begin{pmatrix} V_x \\ V_y \\ \omega \end{pmatrix}$$ [Math. 2]

B is a 4×3 matrix. Matrix components include the wheel diameter of the mecanum wheel 11 and coefficients related to the wheel disposition. The main controller 22 calculates the target rotational velocities of the four mecanum wheels 11 using the target velocity of the omnidirectional mobile body 1 by using relationships of Equation (1) and Equation (2). The main controller 22 can move the omnidirectional mobile body 1 in a desired direction at a desired velocity by outputting the calculated target rotational velocity to the motor control circuit 23.

(Example of Monitoring Area 400)

Figure 4:
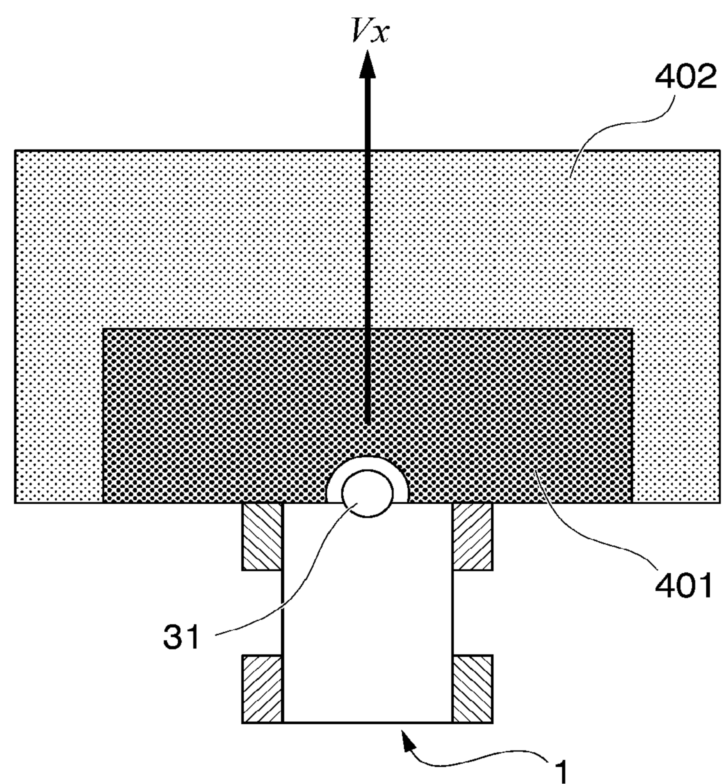
FIG. 4 shows an example of a monitoring area.

FIG. 4 shows an example of the monitoring area 400. In FIG. 4, the monitoring area 400 in which an object is detected by the safety laser scanner 31 is set in front of the omnidirectional mobile body 1. The monitoring area 400 includes the protection area 401 near the omnidirectional mobile body 1, and a warning area 402 farther than the protection area 401.

The protection area 401 is set in consideration of a distance until the omnidirectional mobile body 1 stops, and is, for example, an area within 50 cm of the forward movement direction of the omnidirectional mobile body 1. When the safety laser scanner 31 detects that an obstacle is present in the protection area 401, the circuit breaker 33 (see FIG. 1A) shuts off power to be supplied to the motor control circuit 23 such that the omnidirectional mobile body 1 stops.

The warning area 402 is, for example, an area within 50 cm to several meters in the forward movement direction of the omnidirectional mobile body 1. When the safety laser scanner 31 detects that an obstacle is present in the warning area 402, the main controller 22 controls the motor control circuit 23 to decelerate the omnidirectional mobile body 1. The monitoring area 400 (the protection area 401 and the warning area 402) is an area of which the range can be changed according to a situation.

(Change of Range Of Monitoring Area 400)

Figure 5:
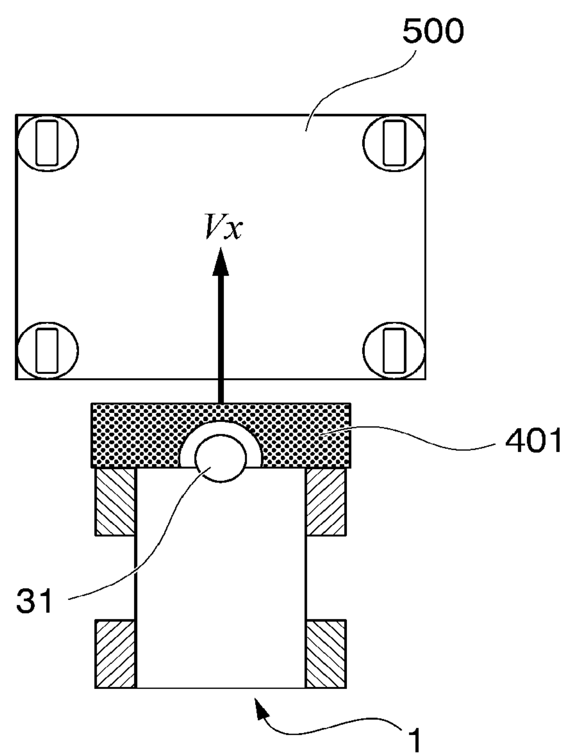
FIG. 5 shows an example of a changed monitoring area.

FIG. 5 is a diagram showing an example of the changed monitoring area 400. As shown in FIG. 5, there is a transport target 500 (a basket cart) in front of the omnidirectional mobile body 1. That is, a situation in which the omnidirectional mobile body 1 has approached the transport target 500 to transport the transport target 500 on the basis of the movement plan is shown. Here, when the safety laser scanner 31 detects the transport target 500 as an obstacle, the omnidirectional mobile body 1 stops and cannot transport the transport target 500.

Therefore, when the omnidirectional mobile body 1 moves near the transport target 500, the range of the protection area 401 is temporarily reduced (or enabled) so that the transport target 500 is not detected as an obstacle. Further, the warning area 402 is temporarily enabled, for example. Accordingly, the omnidirectional mobile body 1 can pick up the transport target 500 (crawling under the transport target 500).

(Relationship Between Velocity of Omnidirectional Mobile Body 1 and Rotational Velocity of Mecanum Wheel 11)

Figure 6:
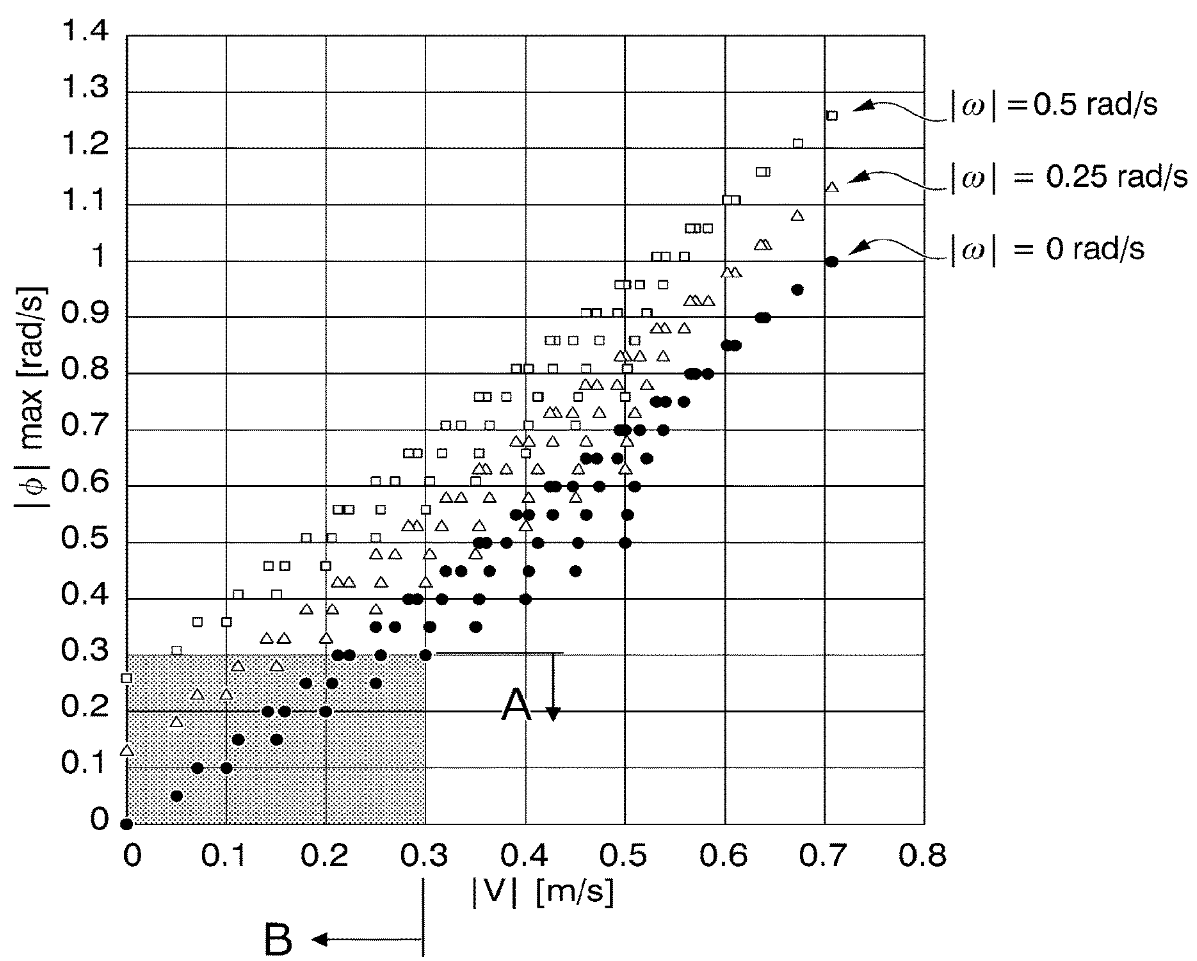
FIG. 6 is a diagram showing an example of a relationship between a velocity of the omnidirectional mobile body and a rotational velocity as an angular velocity of a mecanum wheel.

FIG. 6 is a diagram showing an example of a relationship between a velocity of the omnidirectional mobile body 1 and a rotational velocity (angular velocity) of the mecanum wheel 11. In FIG. 6, a horizontal axis indicates an absolute value |V| of the velocity of the omnidirectional mobile body 1. That is, |V| can be expressed by Equation (3).

$$|V| = \sqrt{Vx^2 + Vy^2}$$ [Math. 3]

A vertical axis indicates an absolute value |ϕ| of a maximum value among the rotational velocities of the four mecanum wheels 11. Further, |ω| shown in FIG. 6 indicates an absolute value of a rotational velocity (angular velocity) of turning of the omnidirectional mobile body 1. |ω| represents one of 0 rad/s, 0.25 rad/s, and 0.5 rad/s.

A relationship in which, for example, when the rotational velocity |ϕ| (the vertical axis) becomes 0.3 rad/s or less (A in FIG. 6), the velocity |V| (a horizontal axis) becomes 0.3 m/s or less (B in FIG. 6), as shown in FIG. 6, is satisfied. Further, this relationship is satisfied even when |ω| increases.

Therefore, when the absolute value |ϕ| of the maximum value among the rotational velocities of the four mecanum wheels 11 is 0.3 rad/s or less, the velocity |V| of the omnidirectional mobile body 1 can be regarded as being 0.3 m/s or less (the omnidirectional mobile body 1 is traveling at a low velocity). A case in which the respective rotational velocities of the four mecanum wheels 11 are detected, the omnidirectional mobile body 1 is regarded as traveling at a low velocity when all of the rotational velocities are equal to or less than a threshold value (for example, 0.3 rad/s), and the range of the protection area 401 is reduced will he described in the first embodiment.

(Logic of Velocity Determination)

Figure 7:
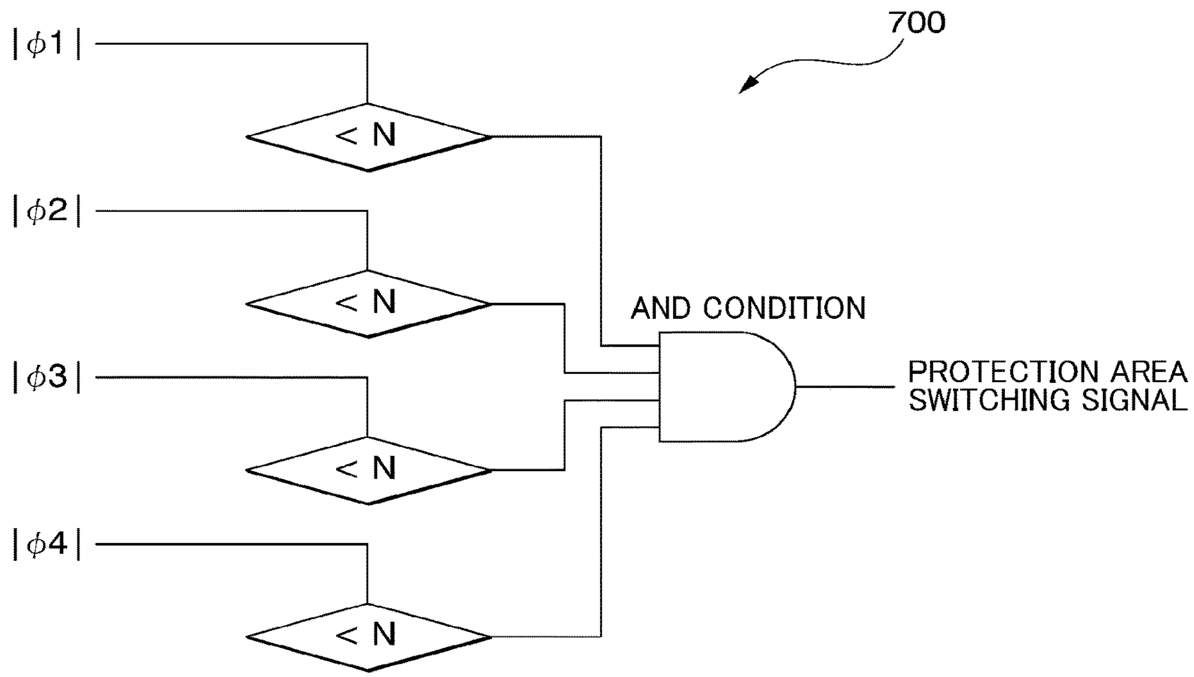
FIG. 7 is a diagram showing a velocity determination logic according to the first embodiment.

FIG. 7 is a diagram showing a velocity determination logic according to the first embodiment. The logic 700 shown in FIG. 7 is a logic that determines whether or not the rotational velocities of the respective wheels of the mecanum wheel 11 are equal to or less than a threshold value, and outputs a logical product of results of the determinations. Specifically, the logic 700 is a logic in which the protection area controller 32 outputs a signal for switching the protection area 401 when all of the rotational velocities ϕ1 to ϕ4 is lower than a threshold value N, that is, when the AND condition is satisfied.

On the other hand, when any one of the rotational velocities ϕ1 to ϕ4 of the mecanum wheels 11*a* to 11*d* detected by the rotational velocity detectors 13*a* to 13*d* is equal to or higher than the threshold value N, the signal for switching the protection area 401 is not output. Accordingly, when all the rotational velocities ϕ1 to ϕ4 are lower than the threshold value N, that is, when the omnidirectional mobile body 1 travels at a low velocity (equal to or lower than the low velocity value Vs), the safety laser scanner 31 can reduce the protection area 401.

It should be noted that in the embodiment, the wheel diameters of the mecanum wheels 11*a* to 11*d* are the same, but this embodiment is not limited thereto and may be different. When the wheel diameters of the respective mecanum wheels 11*a* to 11*d* are different, the rotational velocity of each wheel is multiplied by a conversion coefficient in the determination of the rotational velocity of the logic 700.

Further, in the determination of the rotational velocity of the logic 700, different threshold values may be set.

Further, whereas the threshold value N may have one stage, the threshold value N may have a plurality of stages. For example, when the range of the warning area 402 is reduced, the protection area controller 32 can reduce the range of the warning area 402 by setting a threshold value greater than the threshold value N and outputting a logical product using the threshold value. It should be noted that, in this case, a computation logic for a logical product is a multistage logic, and a signal output is also a multistage output.

(Process of Performing Switching of Protection Area 401)

Figure 8:
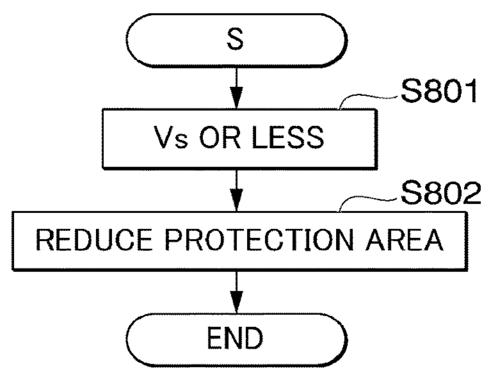
FIG. 8 is a flowchart showing a process of performing switching of the protection area, which is performed by the omnidirectional mobile body according to the first embodiment.

FIG. 8 is a flowchart showing a process of performing switching of the protection area 401, which is performed by the omnidirectional mobile body 1 according to the first embodiment.

In step S801 in FIG. 8, the protection area controller 32 stands by until a velocity of the omnidirectional mobile body 1 becomes equal to or lower than the low velocity value Vs (for example, 0.3 m/s). Specifically, the protection area controller 32 stands by until all of the rotational velocities ϕ1 to ϕ4 of the mecanum wheels 11*a* to 11*d* detected by the rotational velocity detectors 13*a* to 13*d* become lower than the threshold value N (for example, 0.3 rad/s).

When the velocity of the omnidirectional mobile body 1 becomes equal to or lower than the low velocity value Vs, the protection area controller 32 outputs a switching signal for switching the range of the protection area 401 to the safety laser scanner 31. Accordingly, the safety laser scanner 31 reduces (or disables) the protection area 401 (step S802), and ends the series of processes.

With the omnidirectional mobile body 1 of the first embodiment described above, the range of the protection area 401 of the safety laser scanner 31 can be reduced when the omnidirectional mobile body 1 travels at a low velocity (the low velocity value Vs or less). Accordingly, it is possible to prevent the safety laser scanner 31 from detecting the transport target 500 as an obstacle when the omnidirectional mobile body 1 approaches the transport target 500 and travels at a low velocity.

Therefore, the omnidirectional mobile body 1 can pick up the transport target 500 (crawling under the transport target 500) and transport the transport target 500.

In particular, in the omnidirectional mobile body 1 according to the first embodiment, since the range of the protection area 401 can be reduced using the rotational velocity of the mecanum wheel 11 without providing, for example, a plurality of sensors that detect an obstacle, it is possible to perform control of the safety control system with a simple configuration. Therefore, it is possible to operate the omnidirectional mobile body 1 safely with a simple configuration.

Modification Example 1 of First Embodiment

A case in which the range of the protection area 401 is reduced according to an output result of a logical product of the rotation velocities of the respective wheels being equal to or lower than the threshold value, as shown in FIG. 7, has been described in the first embodiment described above.

A case in which the range of the protection area 401 is reduced according to a logical product of the "logical product of the rotation velocities of the respective wheels being equal to or lower than the threshold value" and "an operation signal output from the main controller 22" will be described in modification example 1 of the first embodiment. It should be noted that in the following modification examples and other embodiments, the same contents as the contents described in the first embodiment are denoted by the same reference numerals, and description thereof will be appropriately omitted.

(Logic for Switching of the Protection Area 401)

Figure 9:
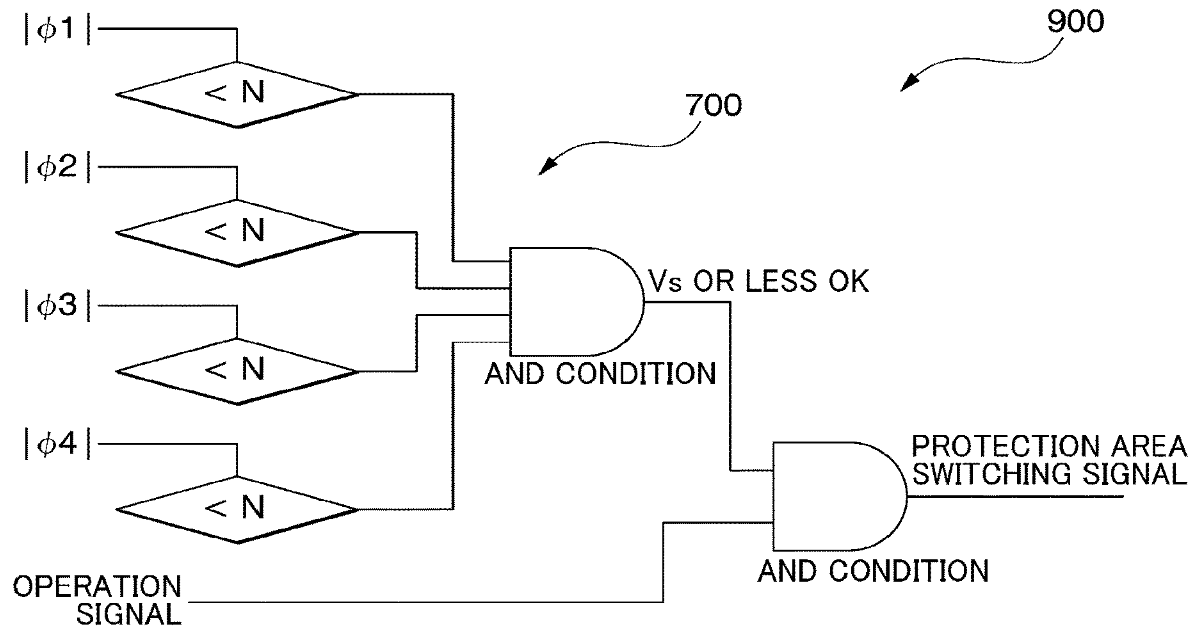
FIG. 9 is a diagram showing a logic for switching of the protection area according to modification example 1 of the first embodiment.

FIG. 9 is a diagram showing a logic for switching of the protection area 401 according to modification example 1 of the first embodiment. A logic 900 shown in FIG. 9 is a logic that outputs a logical product of an output result of the logic 700 and an operation signal from the main controller 22. The operation signal from the main controller 22 is a signal that is output from the main controller 22 according to a movement plan that is a target, for example, when the omnidirectional mobile body 1 is docked with the transport target 500 (a basket cart) (an operation at the time of picking up). The protection area controller 32 outputs a signal for reducing the protection area 401 when an AND condition of an input of the operation signal and a determination result of the velocity shown in the logic 700 is satisfied.

(Process of Performing Switching of Protection Area 401)

Figure 10:
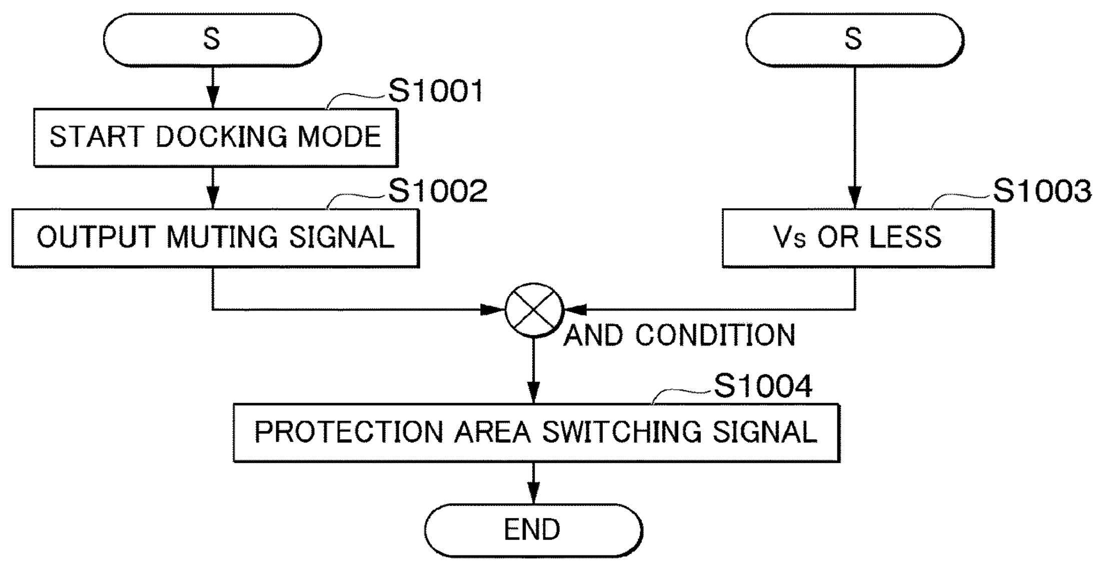
FIG. 10 is a sequence diagram showing a process of performing switching of the protection area, which is performed by the omnidirectional mobile body according to modification example 1 of the first embodiment.

FIG. 10 is a sequence diagram showing a process of performing switching of the protection area 401, which is performed by the omnidirectional mobile body 1 according to modification example 1 of the first embodiment. In step S1001 of FIG. 10, the main controller 22 refers to the movement plan and stands by until the docking mode indicating the start of the transport of the transport target 500 by the omnidirectional mobile body 1 is started. When the docking mode is started, the main controller 22 outputs an operation signal (for example, a muting signal) to the protection area controller 32 (step S1002).

On the other hand, the protection area controller 32 stands by until a velocity of the omnidirectional mobile body 1 becomes equal to or lower than the low velocity value Vs in step S1003. Specifically, the protection area controller 32 stands by until all of the rotational velocities ϕ1 to ϕ4 of the mecanum wheels 11*a* to 11*d* detected by the rotational velocity detectors 13*a* to 13*d* become lower than the threshold value N.

When the velocity of the omnidirectional mobile body 1 becomes equal to or lower than the low velocity value Vs and the operation signal is input from the main controller 22, that is, when the AND condition is satisfied, the protection area controller 32 outputs a switching signal for switching the range of the protection area 401 to the safety laser scanner 31. Accordingly, the safety laser scanner 31 reduces (or disables) the protection area 401 (step S1004), and ends the series of processes.

According to modification example 1 of the first embodiment, when the omnidirectional mobile body 1 travels at a low velocity (the low velocity value Vs or less) near the position in which the transport target 500 is disposed, it is possible to prevent the transport target 500 from being detected as an obstacle by the safety laser scanner 31. That is, even when the omnidirectional mobile body 1 travels at a low velocity, it is possible to prevent the protection area 401 from being reduced unless the omnidirectional mobile body 1 is near the position in which the transport target 500 is disposed. Accordingly, it is possible to limit the reduction in safety by reducing the range of the protection area 401 at an inappropriate position. Further, since the range of the protection area 401 can be reduced at a more appropriate timing, it is possible to improve the efficiency of transport that is performed by the omnidirectional mobile body 1.

Modification Example 2 of First Embodiment

The case in which the range of the protection area 401 is reduced according to the output result of the logical product using the determination result of the rotational velocity of each wheel, as shown in FIG. 7, has been described in the first embodiment described above. A case in which the range of the protection area 401 is reduced according to a logical sum of the "logical product of the rotation velocities of the respective wheels being equal to or lower than the threshold value" and "a calculation value calculated using each rotational velocity of the mecanum wheel 11" will be described in modification example 2 of the first embodiment.

The calculation value referred to herein is a main movement velocity Vx in an x direction (also referred to as a "main traveling direction") of the omnidirectional mobile body 1. A case in which the range of the protection area 401 is reduced when the main movement velocity Vx is negative, that is, when the omnidirectional mobile body 1 moves backward with respect to the main traveling direction, will be described in modification example 2. It is possible to determine whether or not the omnidirectional mobile body 1 is moving backward with respect to the main traveling direction, by using Equation (4).

$$-(\phi 1+\phi 2)+(\phi 3+\phi 4)<0 \quad \text{[Math. 4]}$$

A left side of Equation (4) indicates the main movement velocity Vx. When Equation (4) is satisfied, it can be determined that the omnidirectional mobile body 1 is moving backward.

(Logic for Switching of the Protection Area 401)

Figure 11:
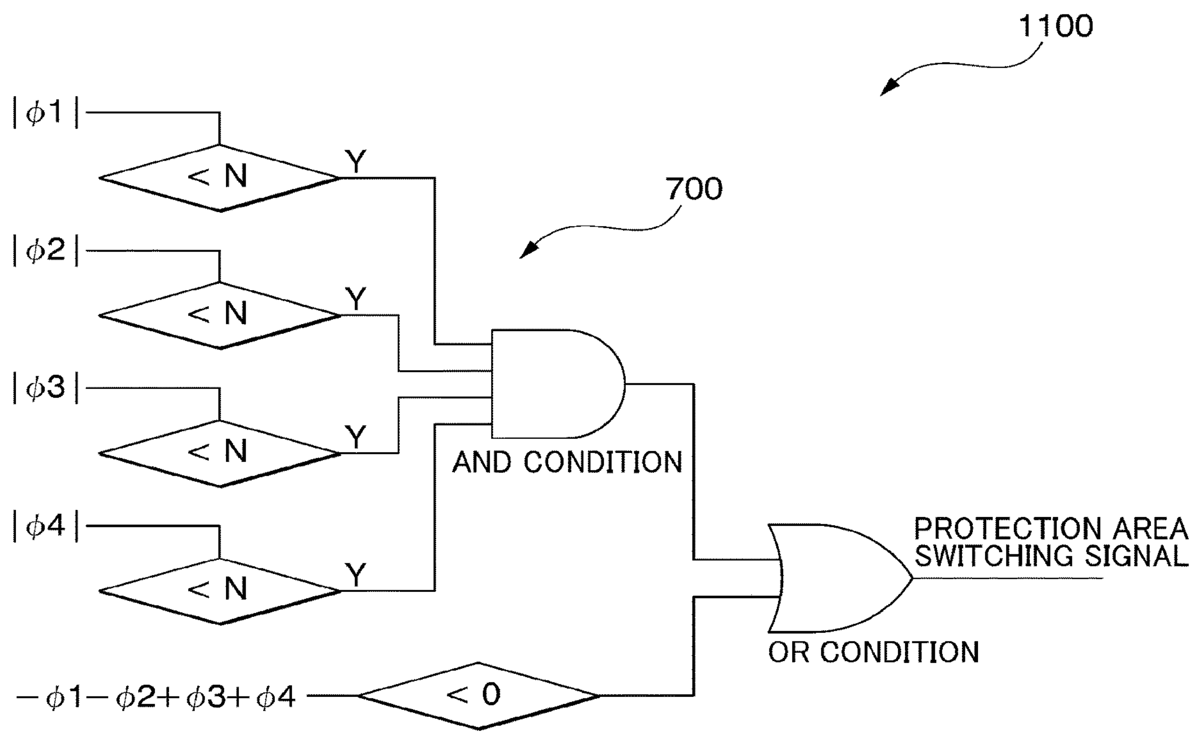
FIG. 11 is a diagram showing a logic for switching of the protection area according to modification example 2 of the first embodiment.

FIG. 11 is a diagram showing a logic for switching of the protection area 401 according to modification example 2 of the first embodiment. A logic 1100 shown in FIG. 11 is a logic that outputs a logical sum (a result of an OR condition) of the output result of the logic 700 and the determination result that the omnidirectional mobile body 1 is moving backward. Using these logics 1100, the protection area controller 32 outputs a signal for reducing the protection area 401 when the OR condition is satisfied.

(Process of Performing Switching of the Protection Area 401)

Figure 12:
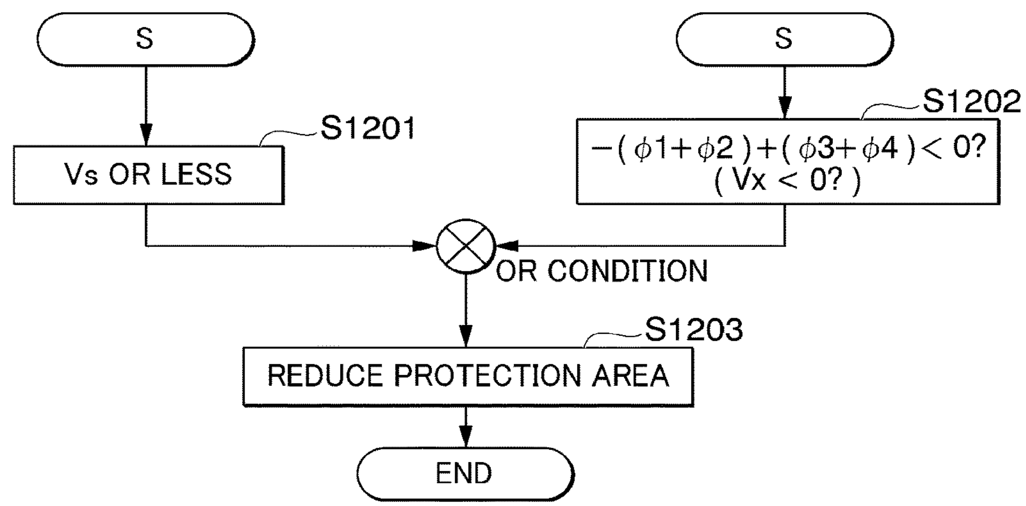
FIG. 12 is a sequence diagram showing a process of performing switching of the protection area, which is performed by the omnidirectional mobile body according to modification example 2 of the first embodiment.

FIG. 12 is a sequence diagram showing a process of performing switching of the protection area 401, which is performed by the omnidirectional mobile body 1 according to modification example 2 of the first embodiment.

In step S1201 of FIG. 12, the protection area controller 32 stands by until a velocity of the omnidirectional mobile body 1 becomes equal to or lower than the low velocity value Vs. Specifically, the protection area controller 32 stands by until all of the rotational velocities ϕ1 to ϕ4 of the mecanum wheels 11*a* to 11*d* detected by the rotational velocity detectors 13*a* to 13*d* become lower than the threshold value N.

Further, in step S1202, the protection area controller 32 stands by until the main movement velocity Vx becomes smaller than 0 (until −(ϕ1+ϕ2)+(ϕ3+ϕ4)<0 is satisfied), which indicates that the omnidirectional mobile body 1 moves backward. When the velocity of the omnidirectional mobile body 1 becomes equal to or lower than the low velocity value Vs or the main movement velocity Vx becomes smaller than 0, that is, when the OR condition is satisfied, the protection area controller 32 outputs a switching signal for switching the range of the protection area 401 to the safety laser scanner 31. Accordingly, the safety laser scanner 31 reduces (or disables) the protection area 401 (step S1203), and ends the series of steps.

According to modification example 2 of the first embodiment, not only when the movement velocity of the omnidirectional mobile body 1 decreases (equal to or lower than the low velocity value Vs), but also when the omnidirectional mobile body 1 moves backward, the protection area of the protection area 401 can be reduced. For example, even in a case in which the omnidirectional mobile body 1 moves backward, for example, in a case in which the omnidirectional mobile body 1 adjusts a direction (a facing direction) with respect to the transport target 500 near the transport target 500, the range of the protection area can be appropriately reduced so that the transport target 500 is not detected as an obstacle. Therefore, it is possible to achieve the efficiency of the transport that is performed by the omnidirectional mobile body 1.

Modification Example 3 of First Embodiment

In modification example 1 of the first embodiment described above, the case in which the range of the protection area 401 is reduced according to the logical product of the "logical product of the rotation velocities of the respective wheels being equal to or lower than the threshold value" and "the operation signal output from the main controller 22" has been described. In modification example 3 of the first embodiment, A case in which the range of the protection area 401 is reduced according to a logical sum of the "logical product of the rotation velocities of the respective wheels being equal to or lower than the threshold value and the logical product of the operation signal from the main controller 22" described in modification example 1 and the "calculation value calculated using each rotational velocity of the mecanum wheel 11" described in modification example 2 will be described.

(Process of Performing Switching of Protection Area 401)

Figure 13:
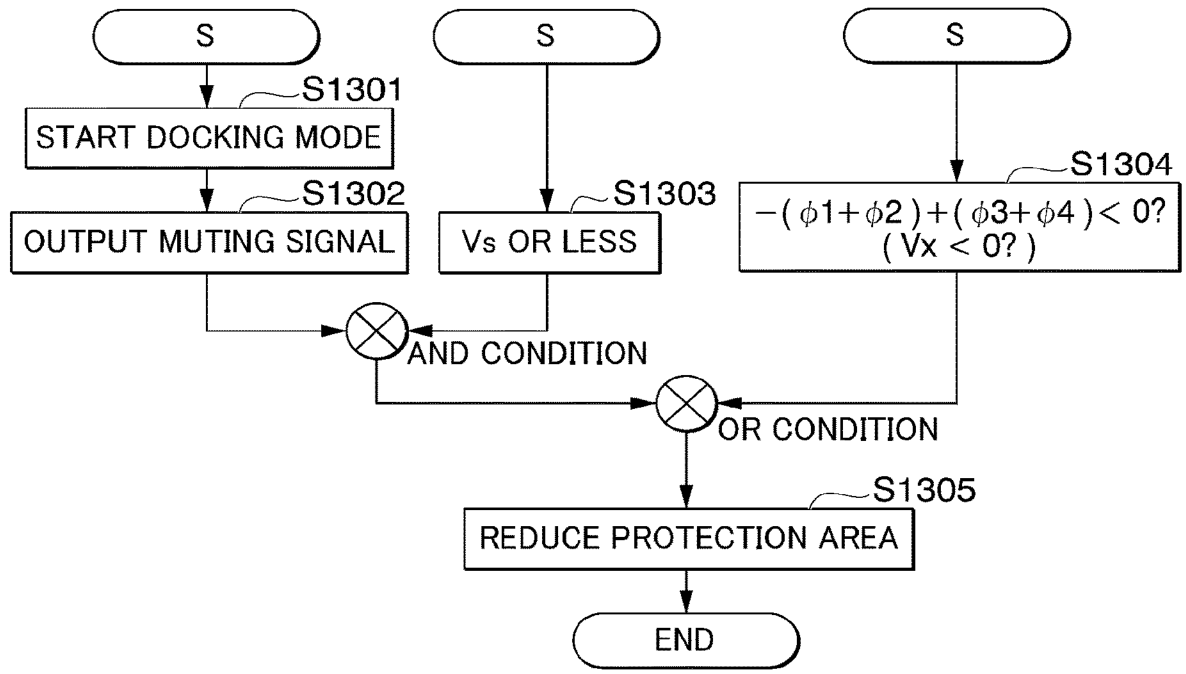
FIG. 13 is a sequence diagram showing a process of performing switching of the protection area, which is performed by the omnidirectional mobile body according to modification example 3 of the first embodiment.

FIG. 13 is a sequence diagram showing a process of performing switching of the protection area 401, which is performed by the omnidirectional mobile body 1 according to modification example 3 of the first embodiment. In step S1301 of FIG. 13, the main controller 22 refers to the movement plan and stands by until the docking mode indicating the start of the transfer of the transport target 500 of the omnidirectional mobile body 1 is started. When the docking mode is started, the main controller 22 outputs an operation signal (for example, a muting signal) to the protection area controller 32 (step S1302).

On the other hand, the protection area controller 32 stands by until a velocity of the omnidirectional mobile body 1 becomes equal to or lower than the low velocity value Vs in step S1303. Specifically, the protection area controller 32 stands by until all of the rotational velocities ϕ1 to ϕ4 of the mecanum wheels 11*a* to 11*d* detected by the rotational velocity detectors 13*a* to 13*d* become lower than the threshold value N.

Further, in step S1304, the protection area controller 32 stands by until the main movement velocity Vx becomes smaller than 0 (until −(ϕ1+ϕ2)+(ϕ3+ϕ4)<0 is satisfied), which indicates that the omnidirectional mobile body 1 moves backward.

It is assumed that (1) An AND condition that the "velocity of the omnidirectional mobile body 1 becomes equal to or lower than the low velocity value Vs and the operation signal is input from the main controller 22" is satisfied, or (2) when the main movement velocity Vx becomes lower than zero, an OR condition of (1) and (2) is satisfied. In this case, the protection area controller 32 outputs a switching signal for switching the range of the protection area 401 to the safety laser scanner 31. Thus, the safety laser scanner 31 reduces (or disables) the protection area 401 (step S1305), and ends the series of steps.

According to modification example 3 of the first embodiment, the effects of both modification example 1 and modification example 2 can be obtained. Therefore, it is possible to limit the reduction in safety of the omnidirectional mobile body 1, and to achieve efficiency of transport that is performed by omnidirectional mobile body 1.

Modification Example 4 of First Embodiment

In the first embodiment described above, the case in which the threshold value used to determine the rotational velocity of each wheel is one type (only the threshold value N) and the rotational velocity is determined in one stage, as shown in FIG. 7, has been described. In modification example 4 of the first embodiment, a case in which the threshold value used to determine the rotational velocity of each wheel is a threshold value different for each wheel, and the rotational velocity is determined in multiple stages (two stages) so that the range of the protection area 401 is reduced will be described. A case in which the range of the protection area 401 is reduced by discriminating that an operation is a specific operation before entrance to the docking mode will be described in modification example 4.

(Logic for Switching of Protection Area 401)

Figure 14:
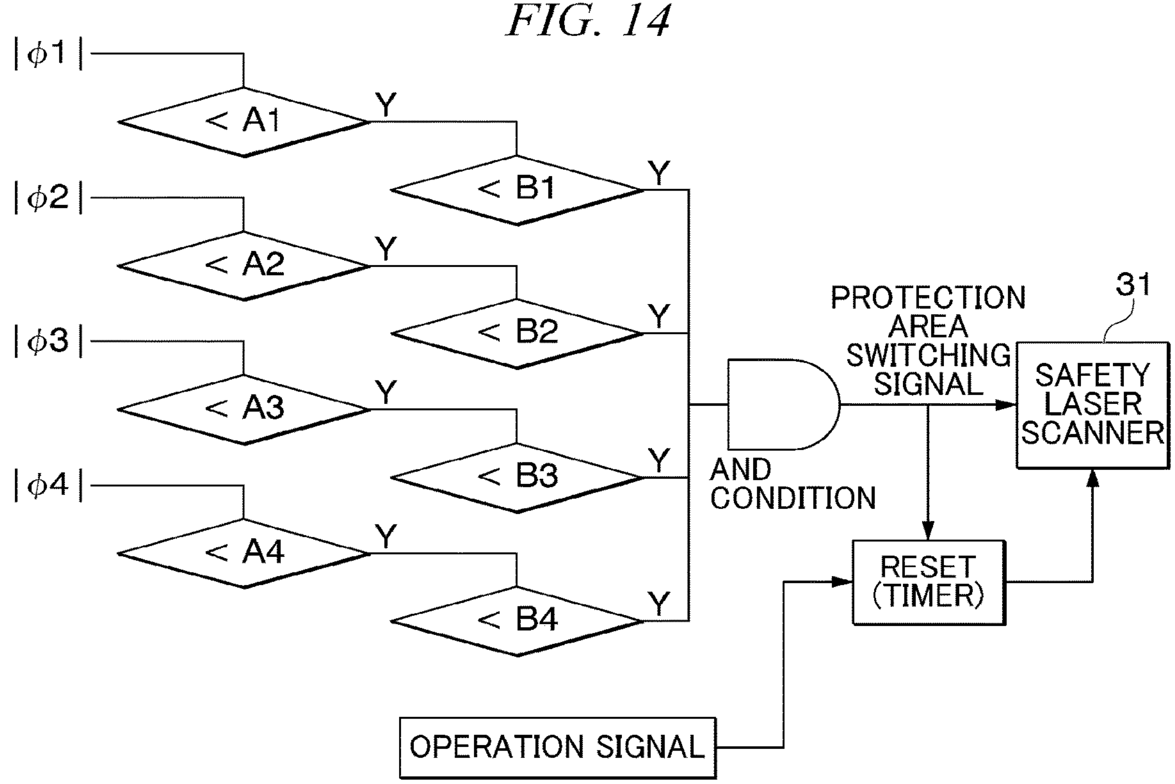
FIG. 14 is a diagram showing the logic for switching of the protection area according to modification example 4 of the first embodiment.

FIG. 14 is a diagram showing a logic for switching of the protection area 401 according to modification example 4 of the first embodiment. A logic 1400 shown in FIG. 14 is logic that determines whether or not the rotational velocities of the respective wheels of the mecanum wheel 11 are equal to or lower than the same or different threshold values, and outputs a logical product of the determination results.

The threshold values A1 to A4 and B1 to B4 set for the respective wheels shown in FIG. 14 are values for discriminating the specific operation before entrance to the docking mode. When the rotational velocity ϕ1 of the mecanum wheel 11*a* detected by the rotational velocity detector 13*a* becomes smaller than the threshold value A1, the protection area controller 32 further stands by until the rotational velocity ϕ1 becomes smaller than the threshold value B1.

Similarly, when the rotational velocities ϕ2 to ϕ4 of the mecanum wheels 11*b* to 11*d* detected by the rotational velocity detectors 13*b* to 13*d* respectively become lower than the threshold values A2 to A4, the protection area controller 32 then stands by until the rotational velocities ϕ2 to ϕ4 become lower than the threshold values B2 to B4.

The protection area controller 32 regards the specific operation before entrance to the docking mode as having been performed when all the rotational velocities ϕ1 to ϕ4 sequentially satisfy the conditions and all the two-stage conditions shown in FIG. 14, that is, when the AND condition is satisfied. Therefore, the protection area controller 32 outputs a switching signal for switching the range of the protection area 401 to the safety laser scanner 31. Accordingly, the safety laser scanner 31 reduces (or disables) the protection area 401.

Further, the main controller 22 outputs an operation signal when a predetermined time has elapsed. Accordingly, the safety laser scanner 31 resets the reduction or disablement of the protection area 401. It should be noted that, when the protection area controller 32 receives an operation signal from the main controller 22, the safety laser scanner 31 may reset the reduction or disablement of the protection area 401 on the basis of an instruction from the protection area controller 32. Further, the safety laser scanner 31 may reset the reduction or disabling of the protection area 401 by directly receiving an operation signal indicating resetting from the main controller 22.

Further, the safety laser scanner 31 may reset reduction or disabling of the protection area 401 on the basis of a measurement result of a timer. The timer may be provided in the protection area controller 32 or may be provided in the safety laser scanner 31. When the timer is provided in the protection area controller 32, the safety laser scanner 31 may reset the reduction or disablement of the protection area 401 on the basis of an instruction based on a measurement result of the timer from the protection area controller 32.

According to modification example 4 of the first embodiment, when the omnidirectional mobile body 1 performs the specific operation before entrance to the docking mode, it is possible to prevent the transport target 500 from being detected as an obstacle by the safety laser scanner 31. Therefore, it is possible to limit the reduction in safety by reducing the range of the protection area. Further, since the range of the protection area 401 can be reduced at a more appropriate timing, it is possible to improve the efficiency of transport that is performed by the omnidirectional mobile body 1.

Further, according to modification example 4 of the first embodiment, even when the operation signal from the main controller 22 is not used, it is possible to discriminate that an operation is the specific operation before entrance to the docking mode and to reduce the range of the protection area 401. Accordingly, it is possible to limit a load related to the output of the operation signal that is performed by the main controller 22.

It should be noted that modification example 1 of the first embodiment may be applied to modification example 4 of the first embodiment. That is, the range of the protection area 401 may be reduced using the operation signal output from the main controller 22. Specifically, the range of the protection area 401 may be reduced according to a logical product of the "logical product of the "rotational velocity ϕ1 to ϕ4 satisfy all the two-stage conditions shown in FIG. 14" and "the operation signal output from main controller 22".

Accordingly, when the omnidirectional mobile body 1 performs the specific operation at the position in which the transport target 500 is disposed (when docking with the transport target 500), it is possible to prevent the transport target 500 from being detected as an obstacle by the safety laser scanner 31. That is, even when the omnidirectional mobile body 1 performs the specific operation, it is possible to prevent the protection area from being reduced unless the omnidirectional mobile body 1 is near the position in which the transport target 500 is disposed. Accordingly, it is possible to limit the reduction in safety by reducing the range of the protection area at an inappropriate position. Further, since the range of the protection area 401 can be reduced at a more appropriate timing, it is possible to improve the efficiency of transport that is performed by the omnidirectional mobile body 1.

Modification Example 5 of First Embodiment

In the first embodiment described above, the case in which the range of the protection area 401 is reduced according to only the rotational velocity of each wheel has been described. A case in which the range of the protection area 401 is reduced according to a logical product of the "logical product of the rotation velocities of the respective wheels being equal to or lower than the threshold value" and "a detection result of rotation abnormality" will be described in modification example 5 of the first embodiment.

Equations (5) and (6) may be used for detection of an abnormality in the rotational velocity of each wheel of the mecanum wheel 11.

$$\phi 1-\phi 2-\phi 3+\phi 4=h \quad \text{[Math. 5]}$$

$$|h|>\xi \quad \text{[Math. 6]}$$

In an ideal state in which there is no abnormality in the rotational velocity detector 13 and there is no slipping between a road surface and the wheels, "$|h|$" shown in Equation (5) is zero. On the other hand, when at least one of the values of $\phi 1$ to $\phi 4$ indicates an abnormal value, "$|h|$" indicates a value equal to or greater than zero. Therefore, by setting "$\xi$" as an allowable value, the abnormal value can be determined using Equation (6).

Here, in Equation (1) for forward kinematics described above, the relationship between $\phi 1$, $\phi 2$, $\phi 3$, and $\phi 4$ and Vx, Vy, and w has been shown. In Equation (1), although $\phi 1$, $\phi 2$, $\phi 3$, and $\phi 4$ can theoretically be any values, $\phi 1$, $\phi 2$, $\phi 3$, and $\phi 4$ cannot be any values in practice due to a constraint condition between the road surface and the wheels.

On the other hand, in Equation (2) for inverse kinematics described above, Vx, Vy, and $\omega$ can be any values. Equation (6) is an equation for determining that a value of any of $\phi 1$ to $\phi 4$ deviating from the constraint condition in Equation (1) has been input.

When $\phi 1=-1$, $\phi 2=-1$, $\phi 3=1$, and $\phi 4=1$, Vx=1, Vy=0, and $\omega=0$ using Equation (1) for forward kinematics.

In this case, $|h|=0$.

Next, when $\phi 1=0$, $\phi 2=-1$, $\phi 3=1$, and $\phi 4=1$, Vx=0.75, Vy=−0.25, and $\omega=-0.4835$ using Equation (1) for forward kinematics In this case, $|h|=1$.

Since $h\neq 0$, it can be determined that there is an abnormality in the rotational velocities of some of the wheels.

When the obtained Vx, Vy, and $\omega$ are applied to Equation (2) for inverse kinematics, $\phi 1=-0.249$, $\phi 2=-0.749$, $\phi 3=1.250$, and $\phi 4=0.75$. Since these contradict $\phi 1=0$, $\phi 2=-1$, $\phi 3=1$, and $\phi 4=1$, which are the input values, it can be determined that there is an abnormality in the rotational velocities of some of the wheels.

(Process of Performing Switching of the Protection Area 401)

Figure 15:
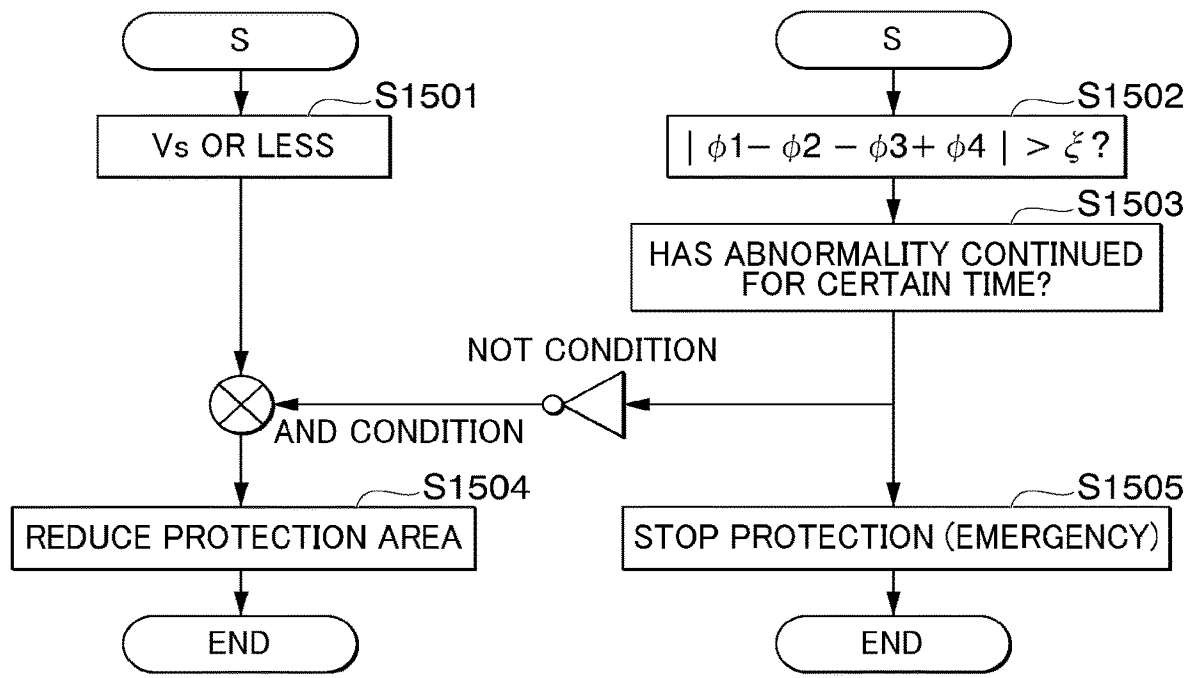
FIG. 15 is a sequence diagram showing a process of performing switching of the protection area, which is performed by the omnidirectional mobile body 1 according to modification example 5 of the first embodiment.

FIG. 15 is a sequence diagram showing a process of performing switching of the protection area 401, which is performed by the omnidirectional mobile body 1 according to modification example 5 of the first embodiment. In step S1501 of FIG. 15, the protection area controller 32 stands by until a velocity of the omnidirectional mobile body 1 becomes equal to or lower than the low velocity value Vs. Specifically, the protection area controller 32 stands by until all of the rotational velocities $\phi 1$ to $\phi 4$ of the mecanum wheels 11*a* to 11*d* detected by the rotational velocity detectors 13*a* to 13*d* become lower than the threshold value N.

Further, the protection area controller 32 stands by until an abnormality is detected, that is, until "$|h|<\xi$" in step S1502. When the abnormality is detected, the protection area controller 32 determines whether the abnormality has continued for a certain time, in step S1503. Here, for example, an averaging filter may be used to determine whether or not the abnormality has continued for a predetermined time. Accordingly, it is possible to prevent rotation abnormality from being determined due to noise or temporary slipping of the wheel, and the omnidirectional mobile body 1 from being stopped.

When the abnormality does not continue for a predetermined time, a NOT condition is satisfied. It is assumed that an AND condition of the NOT condition being satisfied and the velocity of the omnidirectional mobile body 1 becoming equal to or lower than the low velocity value Vs in step S1501 is satisfied. In this case, the protection area controller 32 outputs a switching signal for switching the range of the protection area 401 to the safety laser scanner 31. Accordingly, the safety laser scanner 31 reduces (or disables) the protection area 401 (step S1504), and ends the series of steps.

On the other hand, when the abnormality continues for a certain time, the protection area controller 32 outputs a protection stop signal for stopping the omnidirectional mobile body 1. The protection stop signal is output to the circuit breaker 33 directly from the protection area controller 32 or output to the circuit breaker 33 via another device (the main controller 22, the motor control circuit 23, the safety laser scanner 31, or the like). When the circuit breaker 33 receives the stop signal, the circuit breaker 33 stops the drive motor 12 (step S1505) and ends a series of processes.

According to modification example 5 of the first embodiment, when the omnidirectional mobile body 1 travels at a low velocity (equal to or lower than the low velocity value Vs) in a case in which there is the rotation abnormality or a case in which there is no abnormality in the rotational velocity detector 13, it is possible to reduce the range of the protection area 401 of the safety laser scanner 31. Therefore, when there is no rotation abnormality and a normal operation is performed, the range of the protection area 401 can be reduced and the transport target 500 can be picked up. Therefore, it is possible to operate the omnidirectional mobile body 1 appropriately while improving the safety.

Further, according to modification example 5 of the first embodiment, it is possible to stop the omnidirectional mobile body 1 when there is the rotation abnormality or when there is an abnormality in the rotational velocity detector 13. Therefore, it is to further improve the safety.

Further, in the modification 5 of the first embodiment, when the rotation abnormality of the wheel has been detected for a certain time, the omnidirectional mobile body 1 is stopped. Therefore, it is possible to prevent the omnidirectional mobile body 1 from being stopping by determining that the rotation of the wheel is abnormal due to noise or temporary slipping of the wheel. Accordingly, it is possible to achieve efficiency of transport that is performed by the omnidirectional mobile body 1.

Second Embodiment

The case in which the drive wheels of the omnidirectional mobile body 1 are the four mecanum wheels 11 has been described in the first embodiment described above. In a second embodiment, the case in which the drive wheels of the omnidirectional mobile body 1 are four omni wheels will be described.

(Coordinate System of Omni Wheels 1601*a* to 1601*d*)

Figure 16:
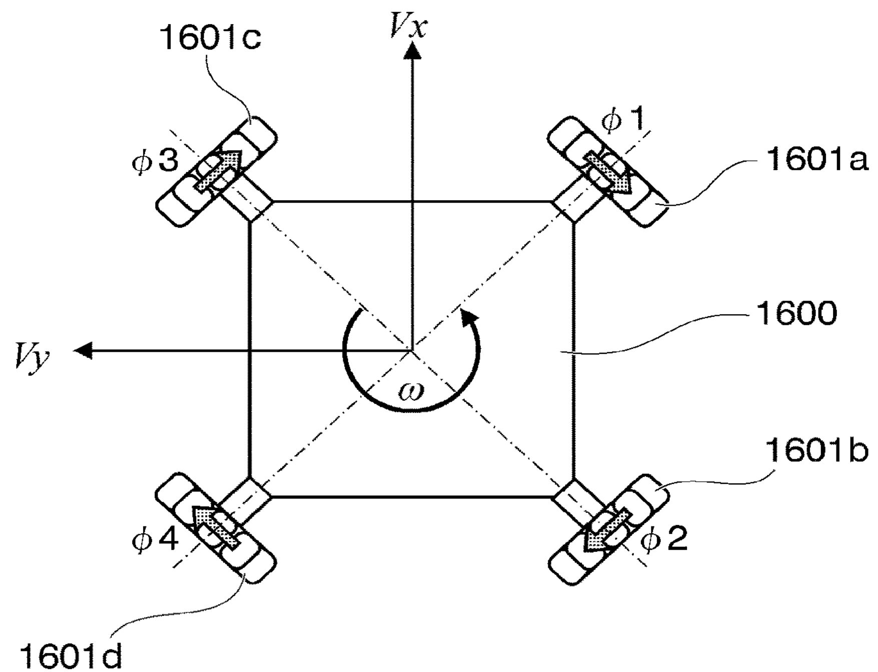
FIG. 16 is a diagram showing an example of a coordinate system of an omnidirectional mobile body and omni wheels.

FIG. 16 is a diagram showing an example of a coordinate system of the omnidirectional mobile body 1600 and omni wheels 1601*a* to 1601*d*. It should be noted that the omni wheels 1601*a* to 1601*d* are simply referred to as "omni wheels 1601" when it is not necessary to distinguish the omni wheels 1601*a* to 1601*d*. As shown in FIG. 16, the omnidirectional mobile body 1600 includes four omni wheels 1601. The four omni wheels 1601 are disposed such that an axle connecting the omni wheel 1601*a* and the omni wheel 1601*d* and an axle connecting the omni wheel 1601*b* and the omni wheel 1601*c* pass through the center of the omnidirectional mobile body 1600 and form an angle of 90°.

In FIG. 16, a traveling direction (a forward moving direction) of the omnidirectional mobile body 1600 is an x-axis, a lateral direction is a y-axis, and a direction perpendicular to the paper is a z-axis (not shown). Further, an shown upper side on the x-axis is a positive direction. An shown left direction on the y-axis is a positive direction.

Further, an shown counterclockwise direction of a turning direction is a positive direction. Further, a velocity in the forward movement direction of the omnidirectional mobile body 1600 is Vx. The velocity of a lateral direction of the omnidirectional mobile body 1600 is Vy. Further, a turning velocity of the omnidirectional mobile body 1600 is ω.

For a rotation direction of each omni wheel 1601, a counterclockwise direction toward a direction (the center of the omnidirectional mobile body 1600) of attachment to the omnidirectional mobile body 1600 is positive. Further, a rotational velocity of the omni wheel 1601*a* is ϕ1, a rotational velocity of the omni wheel 1601*b* is ϕ2, a rotational velocity of the omni wheel 1601*c* is ϕ3, and a rotational velocity of the omni wheel 1601*d* is ϕ4.

Equations (1) to (3) described above can be applied to the omni wheel 1601, as in the mecanum wheel 11 described in the first embodiment. Therefore, the main controller 22 can move the omnidirectional mobile body 1600 in a desired direction at a desired velocity by outputting the calculated target rotational velocity to the motor control circuit 23.

Further, it is possible to determine whether or not the omnidirectional mobile body 1600 is moving backward with respect to the main traveling direction, using Equation (4) described above, as in modification example 2 of the first embodiment. Further, it is possible to determine whether or not there is an abnormality in the rotational velocity of each wheel with respect to the omni wheel 1601, using Equations (5) and (6) described above, as in modification example 5 of the first embodiment.

Therefore, with the omnidirectional mobile body 1600 using the omni wheel 1601 according to the second embodiment, it is possible to achieve the same effects as those of the omnidirectional mobile body 1 using the mecanum wheel 11 shown in the first embodiment. Further, in the second embodiment, it is possible to apply the respective modification examples shown in modification examples 1 to 5 of the first embodiment.

Third Embodiment

In the second embodiment described above, the case in which the drive wheels of the omnidirectional mobile body 1 are four omni wheels has been described. In the third embodiment, a case in which the drive wheels of the omnidirectional mobile body 1 are three omni wheels will be described.

(Coordinate System of Omni Wheels 1701*a* to 1701*c*)

Figure 17:
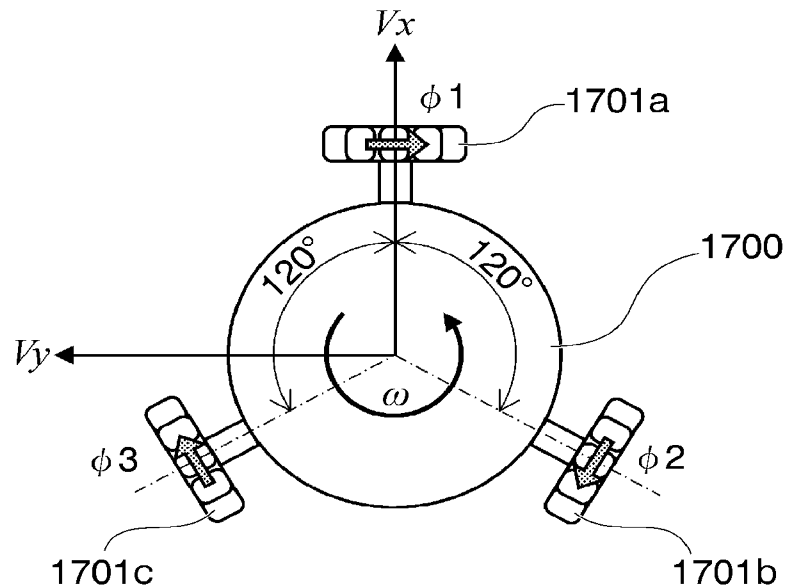
FIG. 17 is a diagram showing an example of a coordinate system of an omnidirectional mobile body and omni wheels.

FIG. 17 is a diagram showing an example of a coordinate system of the omnidirectional mobile body 1700 and the omni wheels 1701*a* to 1701*c*. It should be noted that the omni wheels 1701*a* to 1701*c* are simply referred to as "omni wheels 1701" when it is not necessary to distinguish the omni wheels 1701*a* to 1701*c*. As shown in FIG. 17, the omnidirectional mobile body 1700 includes three omni wheels 1701. The three omni wheels 1701 are disposed such that respective vehicle axles of the omni wheels 1701 pass through a center of the omnidirectional mobile body 1700. Further, the three omni wheels 1701 are disposed such that a distance between the respective axles is an angle of 120°.

In FIG. 17, a traveling direction (a forward moving direction) of the omnidirectional mobile body 1700 is an x-axis, a lateral direction is a y-axis, and a direction perpendicular to the paper is a z-axis (not shown). Further, an shown upper side on the x-axis is a positive direction. An shown left direction on the y-axis is a positive direction. Further, an shown counterclockwise direction of a turning direction is a positive direction. Further, a velocity in the forward movement direction of the omnidirectional mobile body 1700 is Vx. A velocity of a lateral direction of the omnidirectional mobile body 1700 is Vy. Further, a turning velocity of the omnidirectional mobile body 1700 is ω.

For a rotation direction of each omni wheel 1701, a counterclockwise direction toward a direction (the center of the omnidirectional mobile body 1700) of attachment to the omnidirectional mobile body 1700 is positive. Further, a rotational velocity of the omni wheel 1701*a* is ϕ1, a rotational velocity of the omni wheel 1701*b* is ϕ2, and a rotational velocity of the omni wheel 1701*c* is ϕ3.

Here, a relationship between the rotational velocity of each omni wheel 1701 and the movement velocity of the omnidirectional mobile body 1700 for the omnidirectional mobile body 1700 including the three omni wheels 1701 will be described. The rotational velocity of each omni wheel 1701 and the movement velocity of the omnidirectional mobile body 1 can be expressed by Equation (7). Equation (7) is an equation called forward kinematics.

$$\begin{pmatrix} V_x \\ V_y \\ \omega \end{pmatrix} = C \begin{pmatrix} \Phi_1 \\ \Phi_2 \\ \Phi_3 \end{pmatrix} \qquad \text{[Math. 7]}$$

C is a 3×3 matrix. The matrix component includes a wheel diameter of the omni wheel 1701 or a coefficient related to the wheel disposition.

On the other hand, Equation (8) is an equation called inverse kinematics. Equation (8) is an equation for calculating a necessary wheel rotational velocity from the target velocity of the omnidirectional mobile body 1700.

$$\begin{pmatrix} \Phi_1 \\ \Phi_2 \\ \Phi_3 \end{pmatrix} = D \begin{pmatrix} V_x \\ V_y \\ \omega \end{pmatrix} \qquad \text{[Math. 8]}$$

D is a 3×3 matrix. The matrix component includes a wheel diameter of the omni wheel 1701 or a coefficient related to the wheel disposition. The main controller 22 calculates the target rotational velocities of the three omni wheels 1701 from the target velocity of the omnidirectional mobile body 1700 by using relationships of Equation (7) and Equation (8). The main controller 22 can move the omnidirectional mobile body 1700 in a desired direction at a desired velocity by outputting the calculated target rotational velocity to the motor control circuit 23.

(Velocity Determination Logic)

Figure 18:
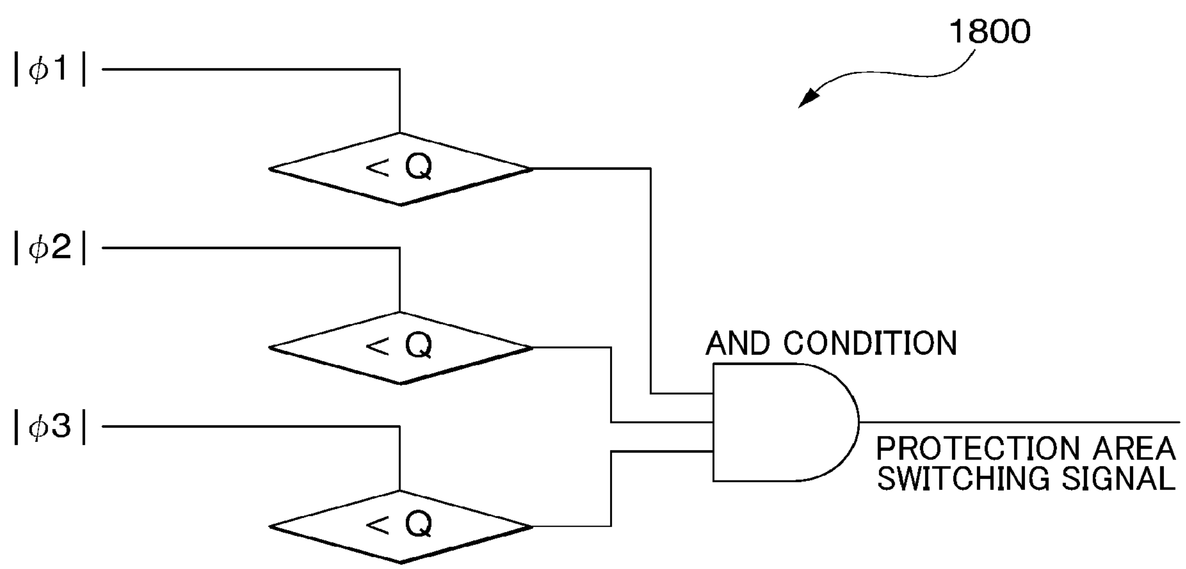
FIG. 18 is a diagram showing a velocity determination logic according to a third embodiment.

FIG. 18 is a diagram showing a velocity determination logic according to a third embodiment. The logic 1800 shown in FIG. 18 is a logic that determines whether or not the rotational velocities of the respective wheels of the omni wheel 1701 are equal to or less than a threshold value, and outputs a logical product of results of the determination. Specifically, the logic 1800 is a logic in which a signal for switching the protection area 401 is output when all of the rotational velocities ϕ1 to ϕ3 are lower than a threshold value Q, that is, when the AND condition is satisfied.

All the rotational velocities ϕ1 to ϕ3 of the omni wheels 1701*a* to 1701*c* detected by the rotational velocity detectors 13*a* to 13*d* being lower than the threshold value Q is that the omnidirectional mobile body 1700 travels at a velocity equal to or lower than the threshold value (at a low velocity). That is, an output result of the logical product in the logic 1800 indicates that the omnidirectional mobile body 1700 travels at a velocity equal to or lower than the threshold value (at a low velocity).

When all of the rotational velocities $\phi 1$ to $\phi 3$ are lower than the threshold value Q, the protection area controller 32 outputs a switching signal for switching the range of the protection area 401 to the safety laser scanner 31. Accordingly, when the omnidirectional mobile body 1700 travels at a low velocity, the safety laser scanner 31 can reduce the range of the protection area 401.

With the omnidirectional mobile body 1700 using the three omni wheels 1701 according to the third embodiment described above, it is possible to achieve the same effects as those of the omnidirectional mobile body 1 using the mecanum wheel 11 shown in the first embodiment.

Further, in the third embodiment, modification examples corresponding to modification examples 1, 3, 4, and 5 of the first embodiment can be applied. It should be noted that it is supplemented that the range of the protection area 401 is reduced according to a logical product of the "logical product of the rotation velocities of the respective wheels being equal to or lower than the threshold value" and a "detection result of rotation abnormality", which has been described in modification example 5 of the first embodiment. In the case of the omnidirectional mobile body 1700 including the three omni wheels 1701, since the rotational velocity of each wheel can be arbitrarily set, an abnormality in the number of rotations cannot be detected only from the respective rotational velocities of the three omni wheels 1701. That is, equations corresponding to Equations (5) and (6) shown in modification example 5 of the first embodiment cannot be obtained.

Therefore, the rotation may be regarded as being abnormal when a difference between the target value of the rotational velocity based on the instruction of the main controller 22 and an actual number of wheel rotations detected by the rotational velocity detector 13 is larger than a predetermined threshold value. Accordingly, in the omnidirectional mobile body 1700 including the three omni wheels 1701, the range of the protection area 401 can be reduced according to a logical product of the "logical product of the rotation velocities of the respective wheels being equal to or lower than the threshold value" and "the detection result of rotation abnormality".

Modification Example 1 of Third Embodiment

In modification example 1 of the third embodiment, an example corresponding to modification example 2 of the first embodiment will be described. In the third embodiment described above, the case in which the range of the protection area 401 is reduced according to the output result of the logical product using the determination result of the rotational velocities of the respective wheels has been described. A case in which the range of the protection area 401 is reduced according to the logical sum of the "logical product of the rotation velocities of the respective wheels being equal to or lower than the threshold value" and a "calculation value calculated using the respective rotational velocities of the omni wheel 1701" will be described in modification example 1 of the third embodiment.

The calculation value said herein may be used for the determination of the main movement velocity Vx of the x direction (also referred to as a "main advancing direction") of the omnidirectional mobile body 1700. A case in which the range of the protection area 401 is reduced when the calculation value is smaller than the predetermined value m will be described in modification example 1. Equation (9) shows a determination equation of the velocity of the omnidirectional mobile body 1 with respect to the main traveling direction.

$$k1 \cdot \phi 1 + k2 \cdot \phi 2 + k3 \cdot \phi 3 < m \quad \text{[Math. 9]}$$

m is a determination threshold value.

k1, k2, and k3 are all appropriate coefficients.

In the example shown in FIG. 17, for example, when that k1=0, k2=−1, and k3=1, Equation (9) is expressed by Equation (10).

$$-\phi 2 + \phi 3 < m \quad \text{[Math. 10]}$$

By using the determination results based on Equations (9) and (10), for example, it can be determined that the omnidirectional mobile body 1700 is moving backward.

In modification example 1 of the third embodiment, a logic that outputs a logical sum (a result of an OR condition) of an output result of the logic 1800 shown in FIG. 18 and a determination result using the calculation value calculated using the respective rotational velocities of the omni wheels 1701 is used. Using this logic, the protection area controller 32 outputs a signal for reducing the protection area 401 when the OR condition is satisfied. Accordingly, the omnidirectional mobile body 1 can reduce the range of the protection area 401.

According to modification example 1 of the third embodiment, not only when the movement velocity of the omnidirectional mobile body 1700 decreases, but also when, for example, the omnidirectional mobile body 1700 moves backward, the range of the protection area 401 can be reduced. For example, even in a case in which the omnidirectional mobile body 1700 moves backward, for example, in a case in which the omnidirectional mobile body 1700 adjusts a direction (a facing direction) with respect to the transport target 500 near the transport target 500, the range of the protection area can be appropriately reduced so that the transport target 500 is not detected as an obstacle. Therefore, it is possible to achieve the efficiency of the transport that is performed by the omnidirectional mobile body 1700.

Functional Configuration of First to Third Embodiments

Next, a functional configuration of the omnidirectional mobile bodies 1, 1600, and 1700 (hereinafter referred to as "omnidirectional mobile body 1 or the like") according to the first to third embodiments described above will be described. The omnidirectional mobile body 1 or the like includes a drive wheel, a rotational velocity detector, an object detector, and a control device. The control device includes a deceleration controller (controller) and a changer.

The drive wheels are three or more drive wheels for moving the omnidirectional mobile body 1 or the like in all directions, and the respective drive wheels are driven independently. For the driving wheels, for example, any of four mecanum wheels 11*a* to 11*d* (see FIG. 3), four omni wheels 1601*a* to 1601*d* (see FIG. 16), and three omni wheels 1701*a* to 1701*c* (see FIG. 17) can be used.

The rotational velocity detector detects the respective rotational velocities of the drive wheels. The rotational velocity detector is realized by the rotational velocity detectors 13*a* to 13*d* (see FIG. 1A). A rotary encoder has been used for the rotational velocity detector (the rotational velocity detectors 13*a* to 13*d*), but this embodiment is not limited thereto. For example, another velocity sensor such as a tachogenerator or a resolver may be used for the rotational velocity detector. Further, a signal output from the rotational velocity detector may be an analog voltage value or may be a digital value obtained by converting the analog voltage value.

The object detector detects an object around the omnidirectional mobile body 1 or the like. An object is an obstacle such as a person or a thing. The object detector detects, for example, an object in the monitoring area 400 (see FIG. 4). The monitoring area 400 includes the protection area 401 and the warning area 402. The object detector is realized by, for example, the safety laser scanner 31 (see FIG. 1A). However, the object detector is not limited to the safety laser scanner 31, and a camera that images an object can be used or another sensor such as an ultrasonic sensor can be used. Further, a plurality of object detectors may be provided. For example, the object detector may be provided on the right and left or the rear of the omnidirectional mobile body 1 or the like.

The deceleration controller decelerates the omnidirectional mobile body 1 or the like when an object is detected in the monitoring area 400 by the object detector. The deceleration is assumed to include stopping. In the deceleration controller, for example, a function of stopping is realized by the circuit breaker 33 (sec FIG. 1A), and the function of decelerating is realized by the main controller 22. For example, when an object is detected in the protection area 401 of the monitoring area 400 by the object detector, the deceleration controller stops the omnidirectional mobile body 1 or the like using the function of the circuit breaker 33. Further, when an object is detected in the warning area 402 of the monitoring area 400 by the object detector, the deceleration controller decelerates the omnidirectional mobile body 1 or the like instead of stopping the omnidirectional mobile body 1 or the like using the function of the main controller 22.

The changer changes the range of the monitoring area 400 on the basis of the respective rotational velocities of the drive wheels detected by the rotational velocity detector. The changer reduces the range of the protection area 401 in the monitoring area 400 set in the object detector, for example, when the respective rotational velocities of the drive wheels are equal to or lower than the threshold value, that is, the velocity of the omnidirectional mobile body 1 or the like is equal to or lower than the low velocity value Vs (for example, 0.3 m/s).

It should be noted that the changer may change not only the range of the protection area 401 but also the range of the warning area 402 on the basis of the respective rotational velocities of the drive wheels. Further, the changer may change only the range of the protection area 401 and not change the range of the warning area 402, or may change only the range of the warning area 402 and may not change the range of the protection area 401.

According to at least an embodiment described above, the range of the protection area 401 can be reduced with a simple configuration without providing a plurality of sensors or the like by including the changer that changes the range of the monitoring area 400 (the protection area 401) on the basis of the rotational velocity of each drive wheel. Therefore, it is possible to prevent the transport target 500 from being discriminated as an obstacle near the transport target 500 and the omnidirectional mobile body 1 from being stopped. As a result, it is possible to improve the safety of the omnidirectional mobile body 1 or the like. Therefore, it is possible to operate the omnidirectional mobile body 1 simply and appropriately.

(Case in which Safety Control System is Realized by Hardware or Software)

The changer determines whether or not the respective rotational velocities of the drive wheels are equal to or higher than a predetermined value, and changes the range of the monitoring area 400 on the basis of a logical product of the determination results. For example, as shown in FIG. 7, the changer reduces the range of the protection area 401 when an AND condition (a logical product) indicating that the rotational velocities of the respective mecanum wheels 11 are equal to or lower than the threshold value has been satisfied.

Specifically, the changer is realized by, for example, the protection area controller 32 (hardware). However, the changer may be realized by the main controller 22 (software). That is, by causing the CPU to execute a predetermined monitoring area change program, the function of the changer of changing the range of the monitoring area 400 of the object detector may be realized.

Further, the function of stopping in the deceleration controller is realized by the circuit breaker 33 (for example, a safety relay). However, the function of stopping in the deceleration controller may be realized by the main controller 22 (software). That is, the function of the deceleration controller of stopping the omnidirectional mobile body 1 or the like by causing the CPU to execute a predetermined stop program may be realized. In this case, for example, a safety controller of which safety certification has been acquired may be used for the deceleration controller. However, a normal controller, a PC, a sequencer, or the like can be used for the deceleration controller.

However, when the function of the changer and the stopping function of the deceleration controller, which are the functions of the safety control system, are realized by software, a computation process of calculating the movement velocity of the omnidirectional mobile body 1 or the like from the rotational velocity detected by the rotational velocity detector is required. When this computation process is incorporated into a safety control system, a lot of time and effort is required for a developer from the viewpoint of securing safety. Specifically, since it is necessary to intensively verify the presence or absence of bugs or errors, and to obtain performance indicators such as a performance level (PL) or a safety integrity level (SIL), it takes a lot of time and effort in a software development process.

Therefore, by realizing the stopping function of the changer or the deceleration controller using a device such as a programmable logic controller (PLC) for safety using a variable constraint language, it is possible to limit such a lot of time and effort in the development process. Further, since the computation process using software can be made unnecessary, it is possible to limit a load of control related to the computation process. Further, it is possible to obtain an accurate output result with a simple configuration. Therefore, it is possible to operate the omnidirectional mobile body 1 or the like appropriately with a simpler structure, and to achieve the improvement of safety of the omnidirectional mobile body 1 or the like.

(Change of Monitoring Area 400 Based on Calculation Value Indicating Movement Velocity)

The changer changes the range of the monitoring area on the basis of the calculation value indicating the movement velocity of the omnidirectional mobile body 1 or the like calculated using the rotational velocities of the drive wheels. The calculation value indicating the movement velocity of the omnidirectional mobile body 1 or the like is, for example, the main movement velocity Vx shown on the left side of Equation (4) described above. The changer reduces the range of the protection area 401, for example, when the main movement velocity Vx becomes lower than 0, that is, when the omnidirectional mobile body 1 or the like moves backward. The determination of the main movement velocity Vx is not limited to "lower than 0", and may be lower than a predetermined velocity. However, the predetermined velocity referred to herein may be a value lower than the low velocity value Vs (for example, 0.3 m/s) indicating that the velocity of the omnidirectional mobile body 1 or the like is low.

Accordingly, even in a case in which the omnidirectional mobile body 1 moves at a lower velocity (the low velocity value Vs or less) or backward, for example, in a case in which the omnidirectional mobile body 170 adjusts a direction (a facing direction) with respect to the transport target 500 near the transport target 500, the range of the protection area can be appropriately reduced so that the transport target 500 is not detected as an obstacle. Therefore, it is possible to achieve the efficiency of the transport that is performed by the omnidirectional mobile body 1.

(Change of Monitoring Area 400 Based on Logical Sum)

The changer determines whether or not the respective rotational velocities of the drive wheels are equal to or higher than a predetermined value, and changes the range of the monitoring area 400 on the basis of a logical sum of a "logical product of results of the determination" and a "calculation value indicating the movement velocity of the omnidirectional mobile body 1 or the like calculated using the respective rotational velocities of the drive wheels". Specifically, as shown in FIG. 11, the changer reduces the range of the protection area 401 when any one (an OR condition) of a condition that the omnidirectional mobile body 1 or the like travels at the low velocity value Vs (for example, 0.3 m/s) or less and a condition that the main movement velocity Vx is lower than 0 is satisfied.

Accordingly, even in a case in which the omnidirectional mobile body 1 moves at a lower velocity or backward, for example, not only in a case in which the omnidirectional mobile body 1 approaches the transport target 500 and travels at a low velocity (the low velocity value Vs or less), but also in a case in which the omnidirectional mobile body 1 adjusts a direction (a facing direction) with respect to the transport target 500, the range of the protection area can be appropriately reduced so that the transport target 500 is not detected as an obstacle. Therefore, it is possible to achieve the efficiency of the transport that is performed by the omnidirectional mobile body 1.

(Change of Monitoring Area 400 Based on Operation Signal)

The changer determines whether or not the respective rotational velocities of the drive wheels are equal to or higher than a predetermined value, and changes the range of the monitoring area 400 on the basis of a logical product of a "logical product of results of the determination" and an "operation signal for switching the operation of the omnidirectional mobile body 1 or the like generated using the movement plan of the omnidirectional mobile body 1 or the like". Specifically, as shown in FIG. 9, the changer reduces the range of the protection area 401 when both (an AND condition) of a condition that the omnidirectional mobile body 1 or the like travels at the low velocity value Vs (for example, 0.3 m/s) or less and a condition that the operation signal (for example, the muting signal) is input is satisfied. Further, the operation signal is not limited to the muting signal, and may be a signal for reducing the range of the protection area 401 or a signal for reducing the range of the warning area 402.

Accordingly, when the omnidirectional mobile body 1 or the like travels at a low velocity (the low velocity value Vs or less) near the position in which the transport target 500 is disposed, it is possible to prevent the transport target 500 from being detected as an obstacle by the object detector. That is, even when the omnidirectional mobile body 1 or the like travels at a low velocity, it is possible to prevent the protection area 401 from being reduced unless the omnidirectional mobile body 1 or the like is near the position in which the transport target 500 is disposed. Therefore, it is possible to limit the reduction in security by reducing the range of the protection area at an inappropriate position. Further, since the range of the protection area 401 can be reduced at a more appropriate timing, it is possible to achieve the efficiency of transport that is performed by the omnidirectional mobile body 1 or the like.

(Stop in Abnormality Detection)

The deceleration controller stops the omnidirectional mobile body 1 or the like when a calculation value indicating a state of the drive wheels calculated using the respective rotational velocities of the drive wheels is equal to or greater than the threshold value indicating an abnormality.

The calculation value indicating the state of the drive wheels calculated using the respective rotational velocities of the drive wheels is, for example, an absolute value "|h|" of the value "h" obtained by Equation (5) described above. The threshold value indicating the abnormality is, for example, "ξ" of Equation (6) described above. The deceleration controller stops the omnidirectional mobile body 1 or the like when the calculation value "|h|" is equal to or greater than the threshold value "ξ" indicating an abnormality.

Accordingly, the deceleration controller can stop the omnidirectional mobile body 1 or the like when there is a rotation abnormality in the omnidirectional mobile body 1 or the like or when there is an abnormality in the rotational velocity detector 13. Therefore, it is possible to further improve the safety.

(Another Example of Stop in Abnormal Detection)

The deceleration controller may stop the omnidirectional mobile body 1 or the like on the basis of a difference between the respective rotational velocities indicated by the velocity command values of the drive wheels and the respective rotational velocities of the drive wheels detected by the rotational velocity detector. Specifically, as another method of detecting a rotation abnormality or an abnormality in the rotational velocity detector 13, the deceleration controller may regard the rotation as being abnormal when a difference between the target value of the rotational velocity based on the instruction of the main controller 22 and an actual number of wheel rotations detected by the rotational velocity detector is larger than the predetermined threshold value, to detect the abnormality.

Even in this case, the deceleration controller can stop the omnidirectional mobile body 1 or the like when there is a rotation abnormality in the omnidirectional mobile body 1 or the like or when there is an abnormality in the rotational velocity detector 13. Therefore, it is possible to further improve the safety.

(Example in which Averaging Filter is Used)

The changer changes the range of the monitoring area 400 on the basis of whether or not the state indicated by the calculation value calculated using the respective rotational velocities of the drive wheels has continued for a certain time. The state indicated by the calculation value calculated using the rotational velocity is, for example, a state indicating a rotation abnormality, that is, a state in which the calculation value "|h|" indicating the state of the drive wheel becomes equal to greater than a threshold value "ξ" indicating an abnormality, as shown in FIG. 15. For example, an averaging filter may be used for a determination as to whether or not the state has continued for the predetermined time. The changer reduces the range of the protection area 401 when the omnidirectional mobile body 1 has traveled at a low velocity (the low velocity value Vs or less) in a case in which the calculation value "|h|" indicating a state of the driving wheel being equal to or greater than the threshold value "ξ" indicating an abnormality does not continue for a predetermined time or more.

On the other hand, the omnidirectional mobile body 1 or the like is stopped regardless of the fact that the omnidirectional mobile body 1 has traveled at a low velocity in a case in which the calculation value "|h|" indicating a state of the driving wheel being equal to or greater than the threshold value "ξ" indicating an abnormality has continued for the predetermined time or more. Accordingly, it is possible to prevent rotation abnormality from being determined due to noise or temporary slipping of the wheel, and the omnidirectional mobile body 1 from being stopped.

However, the state indicated by the calculation value calculated using the rotational velocity is not limited to the state indicating a rotation abnormality. For example, the state may be a state in which the velocity of the omnidirectional mobile body 1 or the like is equal to or lower than the low velocity value Vs (for example, 0.3 m/s) indicating a low velocity, a state indicating that the omnidirectional mobile body 1 is moving backward (for example, the main movement velocity Vx<0), or a state indicating the specific operation before entrance to the docking mode. When these states continue for a certain period of time, the changer may reduce the range of the protection area 401.

Accordingly, it is possible to prevent the changer from reducing the protection area 401 by determining being these states due to noise or the like. Therefore, it is possible to prevent the changer from reducing the protection area 401 at an inappropriate timing and to further improve the safety.

(Monitoring of Velocity at Time Other than Time of Docking)

It should be noted that although the case in which the change of the monitoring area 400 is performed at the time of docking has been described, the change may be performed at times other than the time of docking. For example, the change of the monitoring area 400 may be performed according to only the velocity. For example, when the omnidirectional mobile body 1 or the like travels at a low velocity value Vs (for example 0.3 m/s) or less, the range of the warning area 402 may be reduced, and when the omnidirectional mobile body 1 or the like travels at a velocity exceeding a velocity indicating a low velocity (a high velocity), the range of the warning area 402 may be widened.

Here, since magnitude of harm at the time of collision depends on kinetic energy of the omnidirectional mobile body 1 or the like, it is a general principle to reduce the velocity when there is concern that a collision with a person occurs. Further, when the omnidirectional mobile body 1 moves at a high velocity, a time from detection of an obstacle without contact to physical contact is short. Accordingly, an operation for avoiding the collision may not be in time when it takes a processing time to avoid the collision. In the case of a low velocity movement, an operation for avoiding a collision is in time. Therefore, by performing monitoring of the velocity such as changing the range of the monitoring area 400 according to the velocity of the omnidirectional mobile body 1 or the like, it is possible to improve the safety at a time other than the time of docking.

(Use Example of Velocity Monitoring)

Here, the normal control system may control enabling or disabling of the safety control system. For example, velocity monitoring may be performed as a failsafe function. Specifically, when the omnidirectional mobile body 1 or the like has exceeded a first velocity (velocity limit) in a state in which the safety control system is disabled, the safety control system is enabled and can stop the omnidirectional mobile body 1 or the like. Further, when a second velocity (an emergency stop velocity) is exceeded, control by the safety control system may be given top priority and the safety control system may stop the omnidirectional mobile body 1 or the like regardless of whether the safety control system is enabled or disabled.

(Release of the Reduced Protection Area 401)

Further, in the above description, when the movement velocity of the omnidirectional mobile body 1 or the like becomes equal to or lower than the threshold value (for example, equal to or lower than the low velocity Vs) in a state in which the movement velocity of the omnidirectional mobile body 1 or the like is equal to or higher than the threshold value (for example, equal to or higher than the low velocity Vs), the safety laser scanner 31 receives the switching signal from the protection area controller 32 and reduces the protection area 401.

Thereafter, when the movement velocity of the omnidirectional mobile body 1 or the like becomes equal to or higher than the threshold value, the safety laser scanner 31 causes the reduced range of the protection area 401 to return to a normal range by the output of the switching signal from the protection area controller 32 being released. It should he noted that, in order to prevent chattering when the range of the protection area 401 is switched, the threshold value of the movement velocity may be a different value between when the switching signal is output and when the output of the switching signal is released.

(Velocity Monitoring when Protection Area 401 is Reduced)

Further, the protection area controller 32 may also output a switching signal for reducing the range of the protection area 401 to the main controller 22. The main controller 22 may control the motor control circuit 23 and monitor the velocity so that the movement velocity is not equal to or greater than the threshold value while the switching signal is output from the protection area controller 32 (while the range of the protection area 401 is reduced). The threshold value referred to herein may be a threshold value for determining whether or not the movement velocity is the low velocity value Vs or may be a value (a low velocity) smaller than the threshold value.

Further, when the movement velocity exceeds the threshold value while the switching signal is output, the circuit breaker 33 stops the drive motor 12 and stops the omnidirectional mobile body 1 or the like. Further, for example, when a command to release the switching signal is received from the main controller 22 and no object is detected in the monitoring area 400 by the safety laser scanner 31, the protection area controller 32 releases of the output of the switching signal. When the output of the switching signal from the protection area controller 32 is released, the main controller 22 resets the threshold value of the movement velocity. The threshold value referred to herein may be a threshold value for determining whether or not the movement velocity is the low velocity value Vs or may be a value (a high velocity) higher than the threshold value.

(Another Example of Control Device)

Next, another example of the control device will he described. The case in which the control device includes the deceleration controller and the changer has been described above. Here, a case in which the control device includes only the changer will be described as another example of the control device. The control device described herein is used in connection with a surrounding object detector. The surrounding object detector has, for example, the function of the object detector described above. Specifically, the surrounding object detector is realized by, for example, the safety laser scanner 31. The surrounding object detector outputs a signal for decelerating or stopping an operation of a machine (for example, the omnidirectional mobile body 1 or the like) when a surrounding object is detected in the monitoring area 400.

Further, the control device including the changer is used in connection with the surrounding object detector and changes the range of the monitoring area 400 of the surrounding object detector. The control device receives movement velocity signals from three or more independent movement velocity amount detectors. The movement velocity amount detector has, for example, the function of the rotational velocity detector described above. Specifically, the movement velocity amount detector is realized by, for example, the rotational velocity detectors 13*a* to 13*d* (see FIG. 1A). The control device outputs a signal for changing the range of the monitoring area 400 on the basis of the respective received movement velocity signals. Accordingly, the surrounding object detector changes the range of the monitoring area 400.

With such a control device, since the range of the monitoring area 400 (the protection area 401) can be changed on the basis of the movement velocity signal from the movement velocity amount detector, the range of the protection area 401 can be reduced with a simple configuration without providing a plurality of sensors or the like. Therefore, it is possible to prevent the transport target 500 from being discriminated as an obstacle near the transport target 500 and the machine (the omnidirectional mobile body 1) from being stopped. As a result, it is possible to improve the safety of the machine. Therefore, according to another example of the control device, it is possible to operate the machine simply and appropriately, by using the function of the control device.

(Surrounding Object Detector)

Next, the surrounding object detector will be mainly described. The surrounding object detector has, for example, a function of the object detector described above. Specifically, the surrounding object detector is realized by, for example, the safety laser scanner 31. The surrounding object detector outputs a signal for decelerating or stopping an operation of a machine (for example, the omnidirectional mobile body 1 or the like) when a surrounding object is detected in the monitoring area 400.

Further, in the surrounding object detector, the range of the monitoring area 400 is changed on the basis of the respective movement velocity signals output from three or more independent movement velocity amount detection means. Specifically, in the surrounding object detector, for example, when the velocity of the machine obtained from the movement velocity signal becomes equal to or lower than the low velocity value Vs (for example, 0.3 m/s), the range of the protection area 401 in the monitoring area 400 is reduced.

With such a surrounding object detector, since the range of the monitoring area 400 (the protection area 401) can be changed on the basis of the movement velocity signal from the movement velocity amount detector, the range of the protection area 401 can be reduced with a simple configuration without providing a plurality of sensors or the like. Therefore, it is possible to prevent the transport target 500 from being discriminated as an obstacle near the transport target 500 and the machine (the omnidirectional mobile body 1) from being stopped. As a result, it is possible to improve the safety of the machine. Therefore, according to the surrounding object detector, it is possible to operate the machine simply and appropriately, by using the function of the surrounding object detector.

(Monitoring Device)

Next, the monitoring device will be described. The case in which the surrounding object detector and the control device arc provided separately has been described in the description of "another example of control device" described above. Here, a monitoring device in which the surrounding object detector and the control device are integrally provided will be described. The surrounding object detector described herein has, for example, the function of the object detector described above. Specifically, the surrounding object detector is realized by, for example, the safety laser scanner 31. The surrounding object detector outputs a signal for decelerating or stopping the operation of the machine (for example, the omnidirectional mobile body 1 or the like) when a surrounding object is detected in the monitoring area 400.

The control device is used in connection with the surrounding object detector and changes the range of the monitoring area 400 of the surrounding object detector. The control device receives movement velocity signals from three or more independent movement velocity amount detectors, and outputs a signal for changing the range of the monitoring area 400 on the basis of the respective received movement velocity signals. Accordingly, the surrounding object detector changes the range of the monitoring area 400.

With such a monitoring device, since the range of the monitoring area 400 (the protection area 401) can be changed on the basis of the movement velocity signal from the movement velocity amount detector, the range of the protection area 401 can be reduced with a simple configuration without providing a plurality of sensors or the like. Therefore, it is possible to prevent the transport target 500 from being discriminated as an obstacle near the transport target 500 and the machine (the omnidirectional mobile body 1) from being stopped. As a result, it is possible to improve the safety of the machine. Therefore, according to the monitoring device, it is possible to operate the machine simply and appropriately, by using the function of the monitoring device.

It should be noted that at least some of the functions of the omnidirectional mobile body 1 in the embodiment described above may be realized by a computer. In that case, a program for realizing the functions may be recorded on a computer-readable recording medium. Further, the functions may be realized by loading the program recorded on the recording medium into the computer system and executing the program. It should be noted that the "computer system" referred to herein includes an OS and hardware such as peripheral devices. Further, the "computer-readable recording medium" refers to a storage device such as a hard disk built in a computer system. The storage device also includes a portable medium such as a flexible disk, a magneto-optical disk, a ROM, a CD-ROM, a DVD-ROM, and a USB memory. Further, the "computer-readable recording medium" may include a medium that dynamically holds a program for a short time. Specifically, the "computer-readable recording medium" is a communication line or the like when a program is transmitted via a network such as the Internet or a communication line such as a telephone line. Further, the "computer-readable recording medium" may include a medium that holds a program for a certain period of time.

Specifically, the "computer-readable recording medium" is, for example, a volatile memory inside a computer system including a server and a client. Further, the program may be a program for realizing some of the above-described functions. Further, the program may be a program that can realize the above-described functions in combination with a program already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A mobile body comprising:

three or more drive wheels that allows a mobile body to move in all directions, the respective drive wheels being driven independently;

a rotational velocity detector that detects respective rotational velocities of the drive wheels;

an object detector that detects objects around the mobile body;

a controller that decelerates or stops the mobile body if any object is detected in a monitoring area by the object detector; and a changer that changes a range of the monitoring area on the basis of the respective rotational velocities of the drive wheels detected by the rotational velocity detector, wherein the changer determines whether or not the respective rotational velocities of the drive wheels are equal to or lower than a predetermined value, and changes the range of the monitoring area on the basis of a logical product of results of the determination.

2. The mobile body according to claim 1, wherein the changer determines whether or not the respective rotational velocities of the drive wheels are equal to or higher than a predetermined value, and changes the range of the monitoring area on the basis of a logical sum of a logical product of the results of the determination and a calculation value indicating a movement velocity of the mobile body calculated using the respective rotational velocities of the drive wheels.

3. The mobile body according to claim 1, wherein the changer determines whether or not the respective rotational velocities of the drive wheels are equal to or higher than a predetermined value, and changes the range of the monitoring area on the basis of a logical product of a logical product of the results of the determination and an operation signal for switching an operation of the mobile body generated using a movement plan of the mobile body.

4. The mobile body according to claim 1, wherein the controller decelerates or stops the mobile body when a calculation value indicating a state of the drive wheels calculated using the respective rotational velocities of the drive wheels are equal to or greater than a threshold value indicating an abnormality.

5. The mobile body according to claim 1, wherein the controller decelerates or stops the mobile body on the basis of a difference between the respective rotational velocities indicated by respective velocity command values of the drive wheels and the respective rotational velocities of the drive wheels detected by the rotational velocity detector.

6. The mobile body according to claim 1, wherein the changer changes the range of the monitoring area on the basis of whether or not a state indicated by a calculation value calculated using the respective rotational velocities of the drive wheels has continued for a certain time.

7. The mobile body according to claim 1, wherein the drive wheels are four mecanum wheels.

8. The mobile body according to claim 1, wherein the drive wheels are four omni wheels.

9. The mobile body according to claim 1, wherein the drive wheels are three omni wheels.

10. A control device that is used for a moving device including three or more drive wheels that allows a mobile body to move in all directions, the respective drive wheels being driven independently, a rotational velocity detector that detects respective rotational velocities of the drive wheels, and an object detector that detects an object around the mobile body, the control device comprising:

a controller that decelerates or stops the mobile body when an object is detected in a monitoring area by the object detector; and a changer that changes a range of the monitoring area on the basis of the respective rotational velocities of the drive wheels detected by the rotational velocity detector, wherein the changer determines whether or not the respective rotational velocities of the drive wheels are equal to or lower than a predetermined value, and changes the range of the monitoring area on the basis of a logical product of results of the determination.

11. A control device that is used in connection with a surrounding object detector having an output for decelerating or stopping an operation of a machine when a surrounding object is detected in a monitoring area, and used to change a range of the monitoring area of the surrounding object detector, wherein the control device receives movement velocity signals from three or more independent movement velocity detectors and outputs a signal for changing the range of the monitoring area on the basis of the respective received movement velocity signals, wherein the control device determines whether or not respective rotational velocities of drive wheels are equal to or lower than a predetermined value, and changes the range of the monitoring area on the basis of a logical product of results of the determination.

12. A surrounding object detector comprising output for decelerating or stopping an operation of a machine when a surrounding object is detected in a monitoring area, wherein a range of the monitoring area is changed on the basis of respective movement velocity signals output from three or more independent movement velocity amount detection means, wherein there is made a determination on whether or not respective rotational velocities of drive wheels are equal to or lower than a predetermined value, to change the range of the monitoring area on the basis of a logical product of results of the determination.

13. A monitoring device comprising:

a surrounding object detector having an output for decelerating or stopping an operation of a machine when a surrounding object is detected in a monitoring area; and a control device that is used in connection with the surrounding object detector and used to change a range of the monitoring area of the surrounding object detector, wherein the control device receives movement velocity signals from three or more independent movement velocity detectors and outputs a signal for changing the range of the monitoring area on the basis of the movement velocity signals, wherein the control device determines whether or not respective rotational velocities of drive wheels are equal to or lower than a predetermined value, and changes the range of the monitoring area on the basis of a logical product of results of the determination.

14. A mobile body comprising:

three or more drive wheels that allows a mobile body to move in all directions, the respective drive wheels being driven independently;

a rotational velocity detector that detects respective rotational velocities of the drive wheels;

an object detector that detects objects around the mobile body;

a controller that decelerates or stops the mobile body if any object is detected in a monitoring area by the object detector; and a changer that changes a range of the monitoring area on the basis of the respective rotational velocities of the drive wheels detected by the rotational velocity detector, wherein the controller decelerates or stops the mobile body when a calculation value indicating a state of the drive wheels calculated using the respective rotational velocities of the drive wheels are equal to or greater than a threshold value indicating an abnormality.

* * * * *